US012653175B2

(12) United States Patent
Klein Orbach et al.

(10) Patent No.: US 12,653,175 B2
(45) Date of Patent: Jun. 16, 2026

(54) SELECTIVE AGRICULTURAL SPRAY SYSTEM AND METHOD WITH ONE IMAGE PER NOZZLE

(71) Applicant: Centure Applications LTD, Tel Aviv (IL)

(72) Inventors: Alon Klein Orbach, Tel Aviv (IL); Eran Beck, Tel Aviv (IL); Itzhak Khait, Kibbutz Ein Zivan (IL); Livne Rosenblum, Tel Aviv (IL)

(73) Assignee: Centure Applications LTD, Tel Aviv-Jaffa (IL)

( * ) Notice: Subject to any disclaimer, the term of this patent is extended or adjusted under 35 U.S.C. 154(b) by 195 days.

(21) Appl. No.: 18/459,709

(22) Filed: Sep. 1, 2023

(65) Prior Publication Data

US 2024/0260563 A1 Aug. 8, 2024

Related U.S. Application Data

(60) Provisional application No. 63/495,199, filed on Apr. 10, 2023, provisional application No. 63/483,575, filed on Feb. 7, 2023.

(51) Int. Cl.
*A01M 7/00* (2006.01)
*A01M 21/04* (2006.01)

(52) U.S. Cl.
CPC ........ *A01M 7/0089* (2013.01); *A01M 7/0042* (2013.01); *A01M 21/043* (2013.01); *A01M 7/006* (2013.01)

(58) Field of Classification Search
CPC .............. A01M 7/0089; A01M 7/0042; A01M 21/043; A01M 7/006
(Continued)

(56) References Cited

U.S. PATENT DOCUMENTS 11,393,049 B2    7/2022   Khait et al.
11,944,087 B2 *  4/2024   Mizushima ......... A01M 7/0089
                         (Continued)

FOREIGN PATENT DOCUMENTS

EP        3866593 A1 *   8/2021
EP        4014734 A1 *   6/2022   ........... G06V 20/188
                         (Continued)

OTHER PUBLICATIONS

Somerville, G. J et al. "Analysing the Number of Images Needed to Create Robust Variable Spray Maps." Precision agriculture 22.5 (2021): 1377-1396. Web. (Year: 2021).*
(Continued)

*Primary Examiner* — Erin D Bishop
*Assistant Examiner* — Keith A von Volkenburg
(74) *Attorney, Agent, or Firm* — Intrinsic Law Corp.

(57) ABSTRACT

A method of selective spraying in a selective-spray system that includes a spray boom attached to an agricultural vehicle, the spray boom including a plurality of cameras and a plurality of selective-spray nozzles. The method includes capturing, with each camera, a respective image of a respective region of an agricultural field, each region at a predetermined distance from the spray boom, each image associated with a respective selective-spray nozzle; automatically analyzing, with a computer, each image for a presence of at least one weed; automatically detecting, with the computer, the at least one weed in one or more images; and automatically selectively spraying one or more of the respective regions of the agricultural field using one or more of the selective-spray nozzles according to the one or more images where the at least one weed is detected.

18 Claims, 24 Drawing Sheets

(58) Field of Classification Search
USPC ............................................................. 701/50
See application file for complete search history.

(56) References Cited

U.S. PATENT DOCUMENTS

| | | | |
|---|---|---|---|
| 12,356,977 B2 * | 7/2025 | Glasbrenner | ........ A01B 79/005 |
| 2011/0285842 A1 | 11/2011 | Davenport et al. | |
| 2020/0029490 A1 * | 1/2020 | Bertucci | .............. A01B 79/005 |
| 2020/0230633 A1 | 7/2020 | Serrat et al. | |
| 2021/0103728 A1 | 4/2021 | Young | |
| 2021/0149406 A1 | 5/2021 | Javault et al. | |
| 2021/0365731 A1 | 11/2021 | Takahashi et al. | |
| 2022/0183208 A1 | 6/2022 | Sibley et al. | |
| 2023/0115704 A1 | 4/2023 | Singh | |
| 2024/0188554 A1 * | 6/2024 | Link-Dolezal | ........ A01M 7/006 |
| 2024/0206452 A1 * | 6/2024 | Srinivasan | .......... A01M 7/0057 |
| 2024/0224973 A1 * | 7/2024 | Serrat | ..................... B05B 12/04 |
| 2024/0251065 A1 | 7/2024 | Halevi et al. | |
| 2024/0253074 A1 * | 8/2024 | Rees | .................. G05B 13/0265 |
| 2024/0253075 A1 * | 8/2024 | Hamblin | .............. B05B 12/122 |
| 2024/0257529 A1 | 8/2024 | Rude et al. | |
| 2024/0265680 A1 | 8/2024 | Klein Orbach et al. | |
| 2024/0276971 A1 * | 8/2024 | Zies | ..................... A01B 69/008 |
| 2025/0072413 A1 * | 3/2025 | Simon | ................. A01M 7/0089 |
| 2025/0093886 A1 * | 3/2025 | Bachman | ............... G05D 1/689 |
| 2025/0127156 A1 * | 4/2025 | Freudigmann | ...... A01M 7/0089 |

FOREIGN PATENT DOCUMENTS

| | | | | |
|---|---|---|---|---|
| WO | 2022064482 A1 | 3/2022 | | |
| WO | 2022172274 A1 | 8/2022 | | |
| WO | WO-2024121669 A1 * | 6/2024 | ............. | G06V 10/82 |

OTHER PUBLICATIONS

Dammer, K-H, and Do-Soon Kim. "Real-time Variable-rate Herbicide Application for Weed Control in Carrots." Weed research 56.3 (2016): 237-246. Web. (Year: 2016).*
Sequencer (USB Cameras) Basler, https://docs.baslerweb.com/sequencer-(usb-cameras), Jan. 12, 2023.

* cited by examiner

1300

| DETECTION QUEUE | |
| --- | --- |
| ID No. | Distance (cm) |
| 4 | 90 |
| 3 | 64 |
| 2 | 42 |
| 1 | 16 |

|  | Valve 1 | Valve 2 | Valve 3 | Valve 4 | Valve 5 | Valve 6 | Valve 7 | Valve 8 | Valve 9 | Valve 10 | Valve 11 | Valve 12 |
|---|---|---|---|---|---|---|---|---|---|---|---|---|
| Decision 1 | 1 | 0 | 0 | 0 | 0 | 0 | 0 | 0 | 0 | 0 | 0 | 0 |
| Decision 2 | 0 | 1 | 0 | 0 | 0 | 0 | 0 | 0 | 0 | 0 | 0 | 0 |
| Decision.. | 0 | 0 | 0 | 0 | 0 | 0 | 0 | 1 | 0 | 0 | 0 | 0 |
| Decision 12 | 0 | 0 | 0 | 0 | 0 | 0 | 0 | 0 | 0 | 0 | 0 | 0 |
| Decision: | 1 | 1 | 0 | 0 | 0 | 0 | 0 | 1 | 0 | 0 | 0 | 0 |

2110

SELECTIVE AGRICULTURAL SPRAY SYSTEM AND METHOD WITH ONE IMAGE PER NOZZLE

CROSS-REFERENCE TO RELATED APPLICATIONS

This application claims priority to U.S. Provisional Application No. 63/483,575, titled "Selective Agricultural Spray System With One Image Per Nozzle," filed on Feb. 7, 2023, and to U.S. Provisional Application No. 63/495,199, titled "Real-Time Synchronization of Selective Spraying with Agricultural Field Images," filed on Apr. 10, 2023, which are hereby incorporated by reference.

TECHNICAL FIELD

This application relates generally to systems for spraying an agricultural field.

BACKGROUND

Agricultural spray systems include cameras to capture images of an agricultural field.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to a method of selective spraying in a selective-spray system that includes a spray boom attached to an agricultural vehicle, the spray boom including a plurality of cameras and a plurality of selective-spray nozzles. The method comprises capturing, with each camera, a respective image of a respective region of an agricultural field, each region at a predetermined distance from the spray boom, each image associated with a respective selective-spray nozzle, each region having dimensions corresponding to a spray area of the respective selective-spray nozzle; automatically analyzing, with a computer, each image for a presence of at least one weed; automatically detecting, with the computer, the at least one weed in one or more images; and automatically selectively spraying one or more of the respective regions of the agricultural field using one or more of the selective-spray nozzles associated with the one or more images where the at least one weed is detected.

In one or more embodiments, the method further comprises monitoring, for each image, a respective distance between the respective region of the agricultural field and the spray boom; and when the respective distance is less than or equal to a threshold distance, automatically selectively spraying the one or more of the respective regions of the agricultural field using the one or more of the selective-spray nozzles associated with the one or more images where the at least one weed is detected. In one or more embodiments, each region has a width corresponding to a lateral spray area of the respective selective-spray nozzle, the width and the lateral spray area measured with respect to a first axis that is parallel to a length of the spray boom. In one or more embodiments, the method further comprises maintaining a selective spray of the one or more of the respective regions of the agricultural field for a time period that corresponds to a length of each of the one or more of the respective regions; and stopping the selective spray of the one or more of the respective regions of the agricultural field at an end of the time period.

In one or more embodiments, the method further comprises setting, with the computer, an initial nozzle-to-image distance for each image, the initial nozzle-to-image distance equal to the predetermined distance; repeatedly sampling, with the computer, a speed of the selective-spray system at respective sample times; repeatedly determining, with the computer, a current travel distance that the selective-spray system travelled since the respective capture time of each image, the travel distance determined using a current sampled speed of the selective-spray system, the travel distance measured with respect to an axis; repeatedly determining, with the computer, a respective current nozzle-to-image distance for each image, the respective current nozzle-to-image distance based on the initial nozzle-to-image distance and the current travel distance; repeatedly determining, with the computer, a current spray distance for a selective-spray output from one of the selective-spray nozzles to reach the agricultural field, the current spray distance determined using the current sampled speed of the selective-spray system and a height of the selective-spray nozzles, the spray distance measured with respect to the axis; and when the current spray distance is greater than or equal to the respective current nozzle-to-image distance for a first image where the at least one weed is detected, automatically selectively spraying the agricultural field using the selective-spray nozzle associated with the first image. In one or more embodiments, the method further comprises maintaining the respective current nozzle-to-image distance for each image in a detection queue, each image having a respective image identifier. In one or more embodiments, the method further comprises transferring each image from the detection queue to a spray queue when the respective current nozzle-to-image distance is less than or equal to the current spray distance; and when a respective image is transferred from the detection queue to the spray queue, assigning the respective image a spray distance equal to a frame length of the respective image, the frame length measured with respect to the axis. In one or more embodiments, the method further comprises activating the selective-spray nozzle associated with the first image when the first image is transferred from the detection queue to the spray queue.

Another aspect of the invention is directed to a selective sprayer system comprising an agricultural vehicle; a selective-spot spray (SSP) tank mounted on the agricultural vehicle, the SSP tank holding one or more specific liquid chemicals for treating one or more target weeds growing in the agricultural field; and a spray boom attached to the agricultural vehicle. The spray boom includes a boom frame; a plurality of SSP nozzles mounted on the boom frame, the SSP nozzles fluidly coupled to the SSP tank; and a plurality of cameras, each camera associated with a respective SSP nozzle. The system further comprises a computer in electrical communication with the cameras and the SSP nozzles, the computer including one or more microprocessors; and non-volatile computer memory operatively coupled to the computer. The non-volatile computer memory stores computer-readable instructions that, when executed by the computer, cause the computer to automatically send a first control signal to the cameras, the first control signal causing each camera to capture a respective image of a respective region of an agricultural field, each region at a predetermined distance from the spray boom, each image associated with a respective selective-spray nozzle, each region having dimensions corresponding to a spray area of the respective selective-spray nozzle; automatically analyze each image for a presence of at least one weed; automatically detect the at least one weed in one or more of the images; and automatically send a second control signal to one or more of the selective-spray nozzles, the second control signal causing the one or more of the selective-spray nozzles to selectively spray one or more of the respective regions of the agricultural field according to the one or more images where the at least one weed is detected.

Another aspect of the invention is directed to a method of selective spraying in a selective-spray system that includes a spray boom attached to an agricultural vehicle. The method comprises with a camera associated with a plurality of selective-spray nozzles, the camera and selective-spray nozzles mounted on the spray boom, sequentially capturing images of respective regions of an agricultural field, each region at a predetermined distance from the spray boom, each region having dimensions corresponding to a spray area of the respective selective-spray nozzle, each image associated with a respective selective-spray nozzle, each image captured at a respective capture time; automatically analyzing, with a computer, each image for a presence of at least one weed; automatically detecting, with the computer, the at least one weed in one or more of the images; and automatically selectively spraying one or more of the respective regions of the agricultural field using one or more of the selective-spray nozzles according to the one or more images where the at least one weed is detected.

In one or more embodiments, the camera has a field-of-view that includes all the respective regions of the agricultural field, and the method further comprises maintaining the field-of-view of the camera while sequentially capturing the images. In one or more embodiments, the camera has a field-of-view that includes only one of the respective regions of the agricultural field, and the method further comprises sequentially aligning the field-of-view with each region of the agricultural field; and capturing each image when the field-of-view is aligned with the respective region of the agricultural field.

In one or more embodiments, each region has a width corresponding to a lateral spray area of the respective selective-spray nozzle, the width and the lateral spray area measured with respect to a first axis that is parallel to a length of the spray boom. In one or more embodiments, the method further comprises maintaining a selective spray of the one or more of the respective regions of the agricultural field for a time period that corresponds to a length of each of the one or more of the respective regions; and stopping the selective spray of the one or more of the respective regions of the agricultural field at an end of the time period.

In one or more embodiments, the method further comprises monitoring, for each image, a respective distance between the respective region of the agricultural field and the spray boom; and when the respective distance is less than or equal to a threshold distance, automatically selectively spraying the one or more of the respective regions of the agricultural field using the one or more of the selective-spray nozzles associated with the one or more images where the at least one weed is detected.

In one or more embodiments, the method further comprises setting, with the computer, an initial nozzle-to-image distance for each image, the initial nozzle-to-image distance equal to the predetermined distance; repeatedly sampling, with the computer, a speed of the selective-spray system at respective sample times; repeatedly determining, with the computer, a current travel distance that the selective-spray system travelled since the respective capture time of each image, the travel distance determined using a current sampled speed of the selective-spray system, the travel distance measured with respect to an axis; repeatedly determining, with the computer, a respective current nozzle-to-image distance for each image, the respective current nozzle-to-image distance based on the initial nozzle-to-image distance and the current travel distance; repeatedly determining, with the computer, a current spray distance for a selective-spray output from one of the selective-spray nozzles to reach the agricultural field, the current spray distance determined using the current sampled speed of the selective-spray system and a height of the selective-spray nozzles, the spray distance measured with respect to the axis; and when the current spray distance is greater than or equal to the respective current nozzle-to-image distance for a first image where the at least one weed is detected, automatically selectively spraying the agricultural field using the selective-spray nozzle associated with the first image.

In one or more embodiments, the method further comprises maintaining the respective current nozzle-to-image distance for each image in a detection queue, each image having a respective image identifier. In one or more embodiments, the method further comprises transferring each image from the detection queue to a spray queue when the respective current nozzle-to-image distance is less than or equal to the current spray distance; and when a respective image is transferred from the detection queue to the spray queue, assigning the respective image a spray distance equal to a frame length of the respective image, the frame length measured with respect to the axis. In one or more embodiments, the method further comprises activating the selective-spray nozzle associated with the first image when the first image is transferred from the detection queue to the spray queue.

Another aspect of the invention is directed to a selective sprayer system comprising an agricultural vehicle; a selective-spot spray (SSP) tank mounted on the agricultural vehicle, the SSP tank holding one or more specific liquid chemicals for treating one or more target weeds growing in the agricultural field; and a spray boom attached to the agricultural vehicle. The spray boom includes a boom frame; a plurality of SSP nozzles mounted on the boom frame, the SSP nozzles fluidly coupled to the SSP tank; and a camera mounted on the boom frame, the camera associated with the SSP nozzles. The system further comprises a computer in electrical communication with the camera and the SSP nozzles, the computer including one or more microprocessors; and non-volatile computer memory operatively coupled to the computer. The non-volatile computer memory stores computer-readable instructions that, when executed by the computer, cause the computer to automatically send a first control signal to the camera, the first control signal causing the camera to sequentially capture images of respective regions of an agricultural field, each region at a predetermined distance from the spray boom, each region having dimensions corresponding to a spray area of the respective selective-spray nozzle, each image associated with a respective selective-spray nozzle, each image captured at a respective capture time; automatically analyze each image for a presence of at least one weed; automatically detect the at least one weed in one or more of the images; and automatically send a second control signal to one or more of the selective-spray nozzles, the second control signal causing the one or more of the selective-spray nozzles to selectively spray one or more of the respective regions of the agricultural field according to the one or more images where the at least one weed is detected.

BRIEF DESCRIPTION OF THE DRAWINGS

For a fuller understanding of the nature and advantages of the concepts disclosed herein, reference is made to the detailed description of preferred embodiments and the accompanying drawings.

FIG. 13-17 are simplified illustrations of a detection queue according to an embodiment.

DETAILED DESCRIPTION

An agricultural selective spray system includes a spray boom that includes selective-spray nozzles and one or more cameras. The selective-spray nozzles are configured to selectively spray respective regions of an agricultural field where one or more weeds are detected (e.g., a "weedy" scene). The camera(s) is/are configured to capture an image of each region of the agricultural field at a predetermined distance from the spray boom. Each captured image is associated with a respective region of the agricultural field and with a respective selective-spray nozzle.

A computer is configured to analyze each image for the presence or absence of at least one weed. For each image in which at least one weed is detected, the respective region is selectively sprayed using the respective selective spray nozzle associated with the image and region.

In some embodiments, multiple selective-spray nozzles are associated with a camera. The camera can have a wide field-of-view that includes the regions associated with the selective-spray nozzles that are associated with the camera. The camera sequentially captures image of each region at a respective time to provide a set of images for the selective-spray nozzles that are associated with the camera. Alternatively, the camera can have a narrow field-of-view (e.g., that can include only one of the regions) and the camera is pivoted or rotated to move the field-of-view across the regions to sequentially capture a set of images for the selective-spray nozzles that are associated with the camera.

In another embodiment, only one selective-spray nozzle is associated with each camera. Each camera has a narrow field-of-view that includes only the region associated with the associated selective-spray nozzle.

The timing of selectively spraying the regions in which one or more weeds are detected can be adjusted. Various parameters including the system speed, the nozzle-to-image distance, the current spray distance, and the height of the selective-spray nozzles can be monitored to determine when to activate the selective-spray nozzles.

Figure 1A:
FIG. 1A is a block diagram of a system for selectively applying a treatment to a target region according to an embodiment.
Figure 1A:
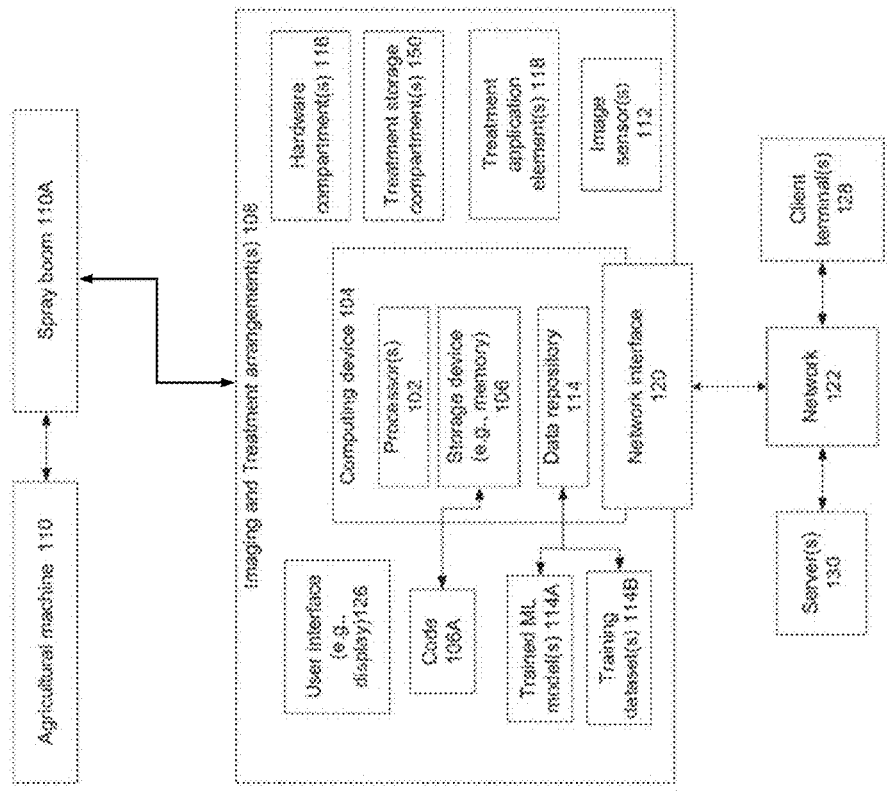

FIG. 1A is a block diagram of a system for selectively applying a treatment to a target region according to an embodiment. System 10 includes one or more imaging and treatment arrangements 108 connected to an agricultural machine 110, for example, a tractor, an airplane, an off-road vehicle, or a drone. Agricultural machine 110 may include and/or be connected to a spray boom 110A and/or another boom. Imaging and treatment arrangements 108 may be arranged along a length of agricultural machine 110 and/or spray boom 110A. For example, the imaging and treatment arrangements 108 can be evenly spaced every 1-4 meters along the length of spray boom 110A. Boom 110A may be long, for example, 10-50 meters, or other lengths. Boom 110A may be pushed or pulled by agricultural machine 110.

An example imaging and treatment arrangement 108 is depicted for clarity, but it is to be understood that system 10 may include multiple imaging and treatment arrangements 108 as described herein. It is noted that each imaging and treatment arrangement 108 may include all components described herein. Alternatively, one or more imaging and treatment arrangements 108 share one or more components, for example, multiple imaging and treatment arrangements 108 share a common computing device 104, common memory 106, and/or common processor(s) 102.

Each imaging and treatment arrangement 108 includes one or more image sensors 112 (e.g., one or more cameras), for example a color sensor, optionally a visible light-based sensor, for example, a red-green-blue (RGB) sensor such as CCD and/or CMOS sensors, and/or other cameras and/or other sensors such as an infra-red (IR) sensor, near infrared sensor, ultraviolet sensor, fluorescent sensor, LIDAR sensor, NDVI sensor, a three-dimensional sensor, and/or multispectral sensor. Image sensor(s) 112 are arranged and/or positioned to capture images of a portion of the agricultural field (e.g., located in front of image sensor(s) 112 and along a direction of motion of agricultural machine 110). A light or illumination source can be aligned with each image sensor 112 to direct light to the respective field area imaged by each image sensor 112. In another embodiment, a light or illumination source can direct light to multiple field areas imaged by multiple image sensors 112. The light/illumination source can include light-emitting diodes (LEDs), lasers, incandescent light, halogen light, fluorescent light, and/or another light.

A computing device 104 receives the image(s) from image sensor(s) 112, for example, via a direct connection (e.g., local bus and/or cable connection and/or short-range wireless connection), a wireless connection and/or via a network. The image(s) are processed by processor(s) 102, which feeds the image into a trained machine learning model 114A (e.g., trained on a training dataset(s) 114B). The machine learning model 114A can be configured to detect one or more weeds, within the field-of-view (FOV) of the image(s). One treatment storage compartment 150 may be selected from multiple treatment storage compartments according to the outcome of ML model 114A, for administration of a treatment by one or more treatment application element(s), as described herein.

Hardware processor(s) 102 of computing device 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Storage device (e.g., memory) 106 stores code instructions executable by hardware processor(s) 102, for example, a random-access memory (RAM), read-only memory (ROM), and/or a storage device, for example, non-volatile memory, magnetic media, solid-state memory devices, semiconductor memory devices, hard drive, removable storage, and optical media (e.g., DVD, CD-ROM). Memory 106 stores code 106A that implements one or more features and/or instructions to be executed by hardware processor(s) 102.

Computing device 104 may include a data repository (e.g., storage device(s)) 114 for storing data, for example, trained ML model(s) 114A which may include a detector component and/or a classifier component, and/or one or more training dataset(s) 114B (used to train ML model(s) 114A). Data storage device(s) 114 may be implemented as, for example, a memory, a local hard-drive, virtual storage, a removable storage unit, an optical disk, a storage device, and/or as a remote server and/or computing cloud (e.g., accessed using a network connection). Additional details regarding the trained ML model(s) 114A and the training dataset(s) 114B are described in U.S. Pat. No. 11,393,049, titled "Machine Learning Models For Selecting Treatments For Treating an Agricultural Field," which is hereby incorporated by reference.

Computing device 104 is in communication with one or more treatment storage compartment(s) (e.g., tanks) 150 and/or treatment application elements 118 that apply treatment for treating the field and/or plants growing on the field. There may be two or more treatment storage compartment(s) 150, for example, one compartment storing chemical(s) specific to one or more weeds, and another compartment storing broad chemical(s) that are non-specific to target growths such as designed for different types of weeds. There may be one or multiple treatment application elements 118 connected to the treatment storage compartment(s) 150, for example, a spot sprayer connected to a first compartment storing specific chemicals for one or more weeds, and a broad sprayer connected to a second compartment storing non-specific chemicals for different types of weeds. For example, the treatment applications elements can include one or more spot-sprayer nozzles that is/are fluidly coupled to the first compartment via one or more spot-spray lines and/or one or more broad-sprayer nozzles that is/are fluidly coupled to the second compartment via one or more broad-spray lines. Other examples of treatments and/or treatment application elements 118 include: gas application elements that apply a gas, electrical treatment application elements that apply an electrical pattern (e.g., electrodes to apply an electrical current), mechanical treatment application elements that apply a mechanical treatment (e.g., sheers and/or cutting tools and/or high pressure-water jets for pruning crops and/or removing weeds), thermal treatment application elements that apply a thermal treatment, steam treatment application elements that apply a steam treatment, and laser treatment application elements that apply a laser treatment.

Computing device 104 and/or imaging and/or treatment arrangement 108 may include a network interface 120 for connecting to a network 122, for example, one or more of, a network interface card, an antenna, a wireless interface to connect to a wireless network, a physical interface for connecting to a cable for network connectivity, a virtual interface implemented in software, network communication software providing higher layers of network connectivity, and/or other implementations.

Computing device 104 and/or imaging and/or treatment arrangement 108 may communicate with one or more client terminals (e.g., smartphones, mobile devices, laptops, smart watches, tablets, desktop computer) 128 and/or with a server(s) 130 (e.g., web server, network node, cloud server, virtual server, virtual machine) over network 122. Client terminals 128 may be used, for example, to remotely monitor imaging and treatment arrangement(s) 108 and/or to remotely change parameters thereof. Server(s) 130 may be used, for example, to remotely collected data from multiple imaging and treatment arrangement(s) 108 optionally of different agricultural machines, for example, to create new training datasets and/or update exiting training dataset for updating the ML models with new images.

Network 122 may be implemented as, for example, the internet, a local area network, a wire-area network, a virtual network, a wireless network, a cellular network, a local bus, a point-to-point link (e.g., wired), and/or combinations of the aforementioned.

Computing device 104 and/or imaging and/or treatment arrangement 108 includes and/or is in communication with one or more physical user interfaces 126 that include a mechanism for user interaction, for example, to enter data (e.g., define threshold and/or set of rules) and/or to view data (e.g., results of which treatment was applied to which portion of the field).

Example physical user interfaces 126 include, for example, one or more of, a touchscreen, a display, gesture activation devices, a keyboard, a mouse, and voice activated software using speakers and microphone. Alternatively, client terminal 128 serves as the user interface, by communicating with computing device 104 and/or server 130 over network 122.

Treatment application elements 118 may be adapted for spot spraying and/or broad (e.g., band) spraying, for example as described in U.S. Provisional Patent Application No. 63/149,378, filed on Feb. 15, 2021, which is hereby incorporated by reference.

System 10 may include a hardware component 116 associated with the agricultural machine 110 for dynamic adaptation of the herbicide applied by the treatment application element(s) 118 according to dynamic orientation parameter(s) computed by analyzing an overlap region of images captured by image sensors 112, for example as described in U.S. Provisional Patent Application No. 63/082,500, filed on Sep. 24, 2020, which is hereby incorporated by reference.

Figure 1B:
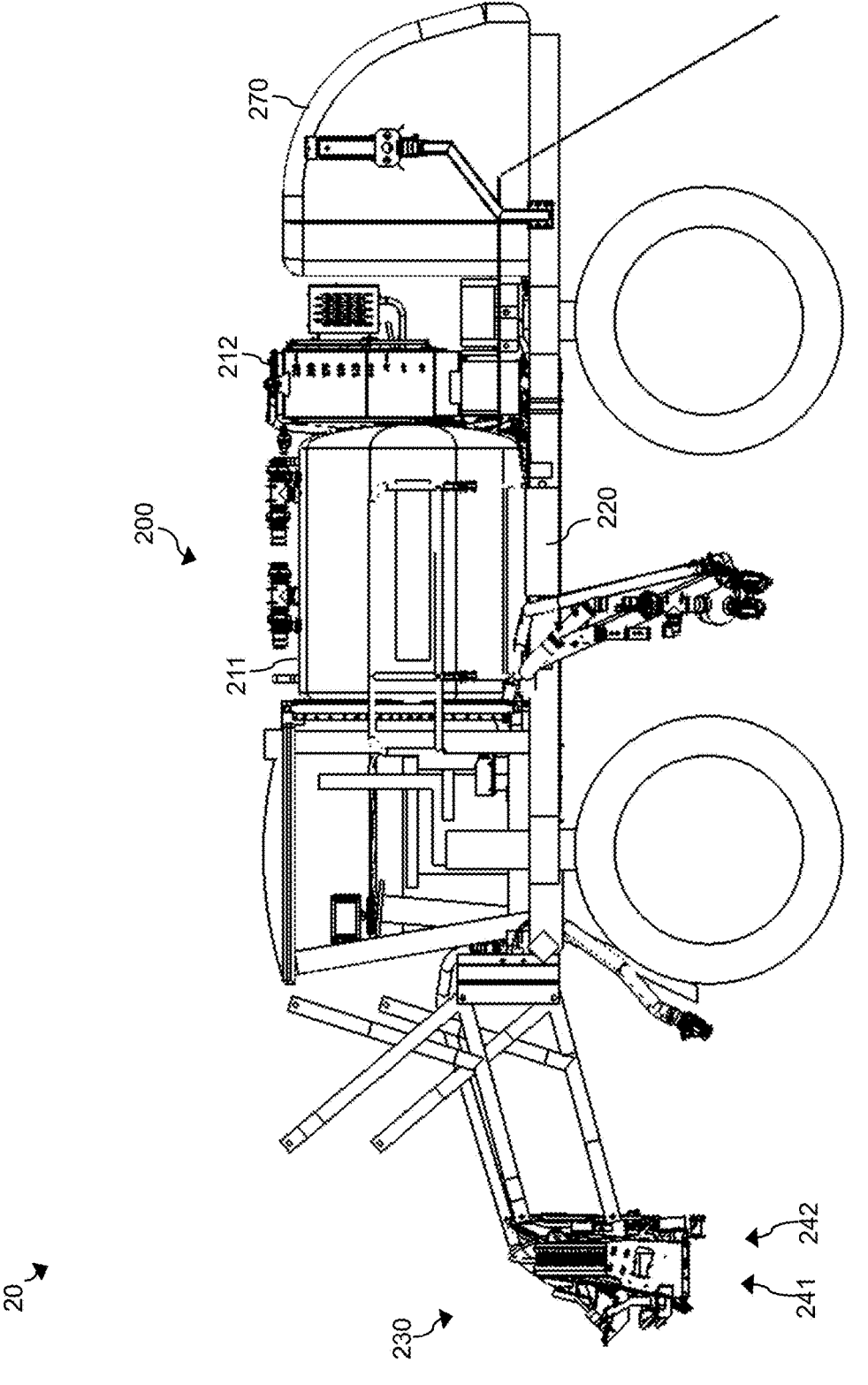
FIG. 1B is a side view of a dual sprayer system according to an embodiment.

FIG. 1B is a side view of a dual sprayer system 20 according to an embodiment. System 20 can be the same as or different than system 10. The system 20 includes an agricultural vehicle 200, a broadcast tank 211, an SSP tank 212, a rinse tank 220, and a spray boom 230. The spray boom 230 is illustrated as partially exploded.

The broadcast tank 211 is mounted on the agricultural vehicle 200 and is configured to hold one or more general-application liquid chemicals (e.g., herbicides) to be sprayed broadly onto an agricultural field using the spray boom 230, which is attached (e.g., releasably attached) to the agricultural vehicle 200. The broadcast liquid chemicals are configured to prevent weeds and/or other undesirable plants from growing. One or more first fluid lines 241 fluidly couple the broadcast tank 211 to broadcast nozzles on the spray boom 230. In some embodiments, the broadcast tank 211 and the first fluid lines 241 can be optional in which case system 20 is a selective-sprayer system.

The SSP tank 212 is mounted on the agricultural vehicle 200 and is configured to hold one or more target-application or specific chemical(s) (e.g., herbicide(s)) that is/are designed to target one or more weeds growing in the agricultural field. One or more second fluid lines 242 fluidly couple the SSP tank 212 to SSP nozzles on the spray boom 230. The specific chemical(s) in the SSP tank 212 are selectively sprayed using the SSP nozzles in response to imaging of the agricultural field and analysis/detection by one or more trained machine learning models. Valves or solenoids coupled to the SSP nozzles can be opened and closed to selectively spray the detected weeds.

The rinse tank 220 is fluidly coupled to the broadcast tank 211 and to the SSP tank 212. Water and/or another liquid stored in the rinse tank 220 can be used to rinse the broadcast tank 211 and the SSP tank 212 after each tank 211, 212 is emptied.

The engine 270 of the agricultural vehicle 200 can be replaced with a motor when the agricultural vehicle 200 is electric or can include both an engine and a motor when the agricultural vehicle 200 is a hybrid. In any case, the agricultural vehicle 200 includes a mechanical drive system that powers the agricultural vehicle 200 and the wheels.

Figure 2:
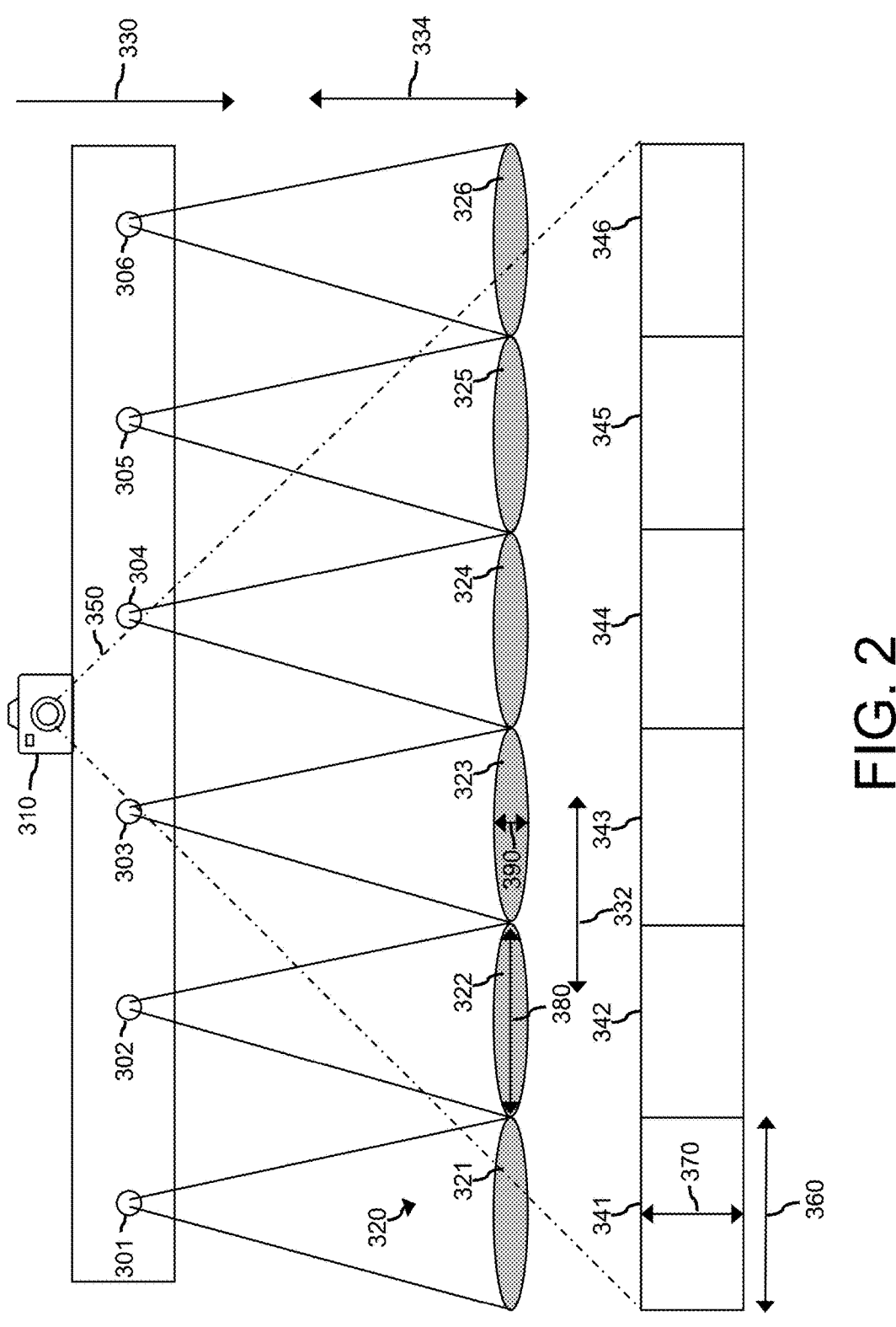
FIG. 2 is a simplified illustration of a portion of a spray boom according to an embodiment.

FIG. 2 is a simplified illustration of a portion of a spray boom 30 according to an embodiment. Spray boom 30 can be the same as or different than spray boom 110A. The spray boom 30 can include a plurality of the illustrated portions, for example as in a repeating until along the length of the spray boom 30. Thus, the spray boom 30 can include multiple cameras and associated spray nozzles, though only one camera is illustrated.

The spray boom 30 includes more spray nozzles than cameras. In the illustrated example, there are 6 spray nozzles 301-306 (in general, spray nozzles 300) and one camera 310. In other embodiments, there can be more spray nozzles per camera (e.g., 7-10 spray nozzles/camera) or fewer spray nozzles per camera (e.g., 2-5 spray nozzles/camera). The spray nozzles 301-306 are assigned to or associated with the camera 310. Each spray nozzle 301-306 is configured to selectively spray a respective field spray area 321-326 (in general, field spray area 320) in front of the spray boom 30 along its direction of travel 330.

The camera 310 is configured to sequentially capture images of a respective field region 341-346 (in general, field region 340) at a predetermined distance in front of each spray boom 30 along its direction of travel 330. For example, the camera 310 can comprise a Basler camera that is configured in a sequencer mode. The camera 310 can have a wide field-of-view (FOV) 350 such that field regions 341-346 lie within the FOV 350. The camera 310 can capture images in response to a control signal from the computer 104 (FIG. 1A).

Each field region 340 has a respective width 360 and a respective length 370. The width 360 of each field region 340 can be measured with respect to a lateral axis 332 (e.g., a first axis) that is orthogonal to the direction of travel 330 and parallel to a length of the spray boom 30. The width 360 of each field region 340 is equal to (or approximately equal to (e.g., within about 5%)) a corresponding width 380 (e.g., lateral spray area) of the respective field spay area 320 of the respective spray nozzle 300.

The length 370 of each field region 340 can be measured with a respect to a length axis 334 (e.g., a second axis) that is parallel to the direction of travel 330 and orthogonal to the lateral axis 332. The length 370 of each field region 340 can be larger than a corresponding length 390 of the respective field spay area 320 of the respective spray nozzle 300. In other embodiments, the length 370 of each field region 340 can be approximately equal to (e.g., within about 5%) a corresponding length 390 of the respective field spay area 320 of the respective spray nozzle 300.

Figure 3:
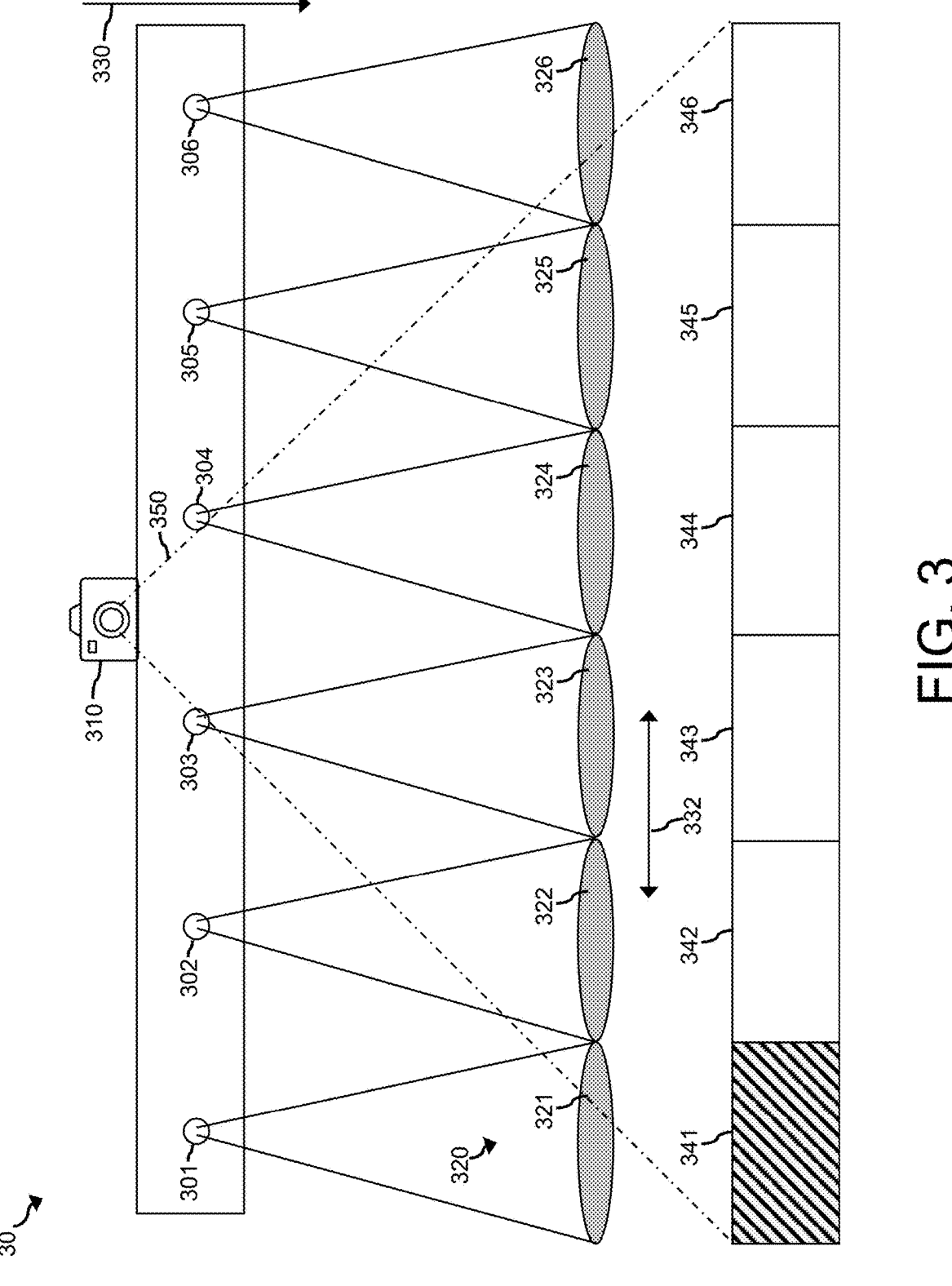
FIGS. 3-8 are simplified illustrations showing the camera on the spray boom, illustrated in FIG. 2, sequentially capturing images of different field regions.

The images of the respective field regions 341-346 are sequentially captured over time, for example as illustrated in FIGS. 3-8. The camera 310 captures an image of the first field region 341 at a first time, as illustrated in FIG. 3. The first field spray area 321 of the first spray nozzle 301 is configured to be aligned with the first field region 341 when the spray boom 30 is moved along its direction of travel 330. The width of the first field region 341 is equal to (or approximately equal to) the width 360 of the first field spay area 321 of the first spray nozzle 301. When the first spray nozzle 301 is activated, the first field spay area 321 is sprayed across its width 360. Spraying of the first field region 341 is maintained for a time period that corresponds to the length 370 of the first field region 341 so that the first spray nozzle 301 sprays throughout the length 370 of the first field region 341. The first spray nozzle 301 stops spraying at the end of the time period. Alternatively, when the length 370 of the first field region 341 is approximately equal to (e.g., within about 5%) the length 390 of the first field spay area 321, the first spray nozzle 301 can spray for a shorter time period and at a flow rate to provide an appropriate volume of specific liquid chemicals across the dimensions (e.g., length 370 and width 360) of the first field region 341.

Figure 4:
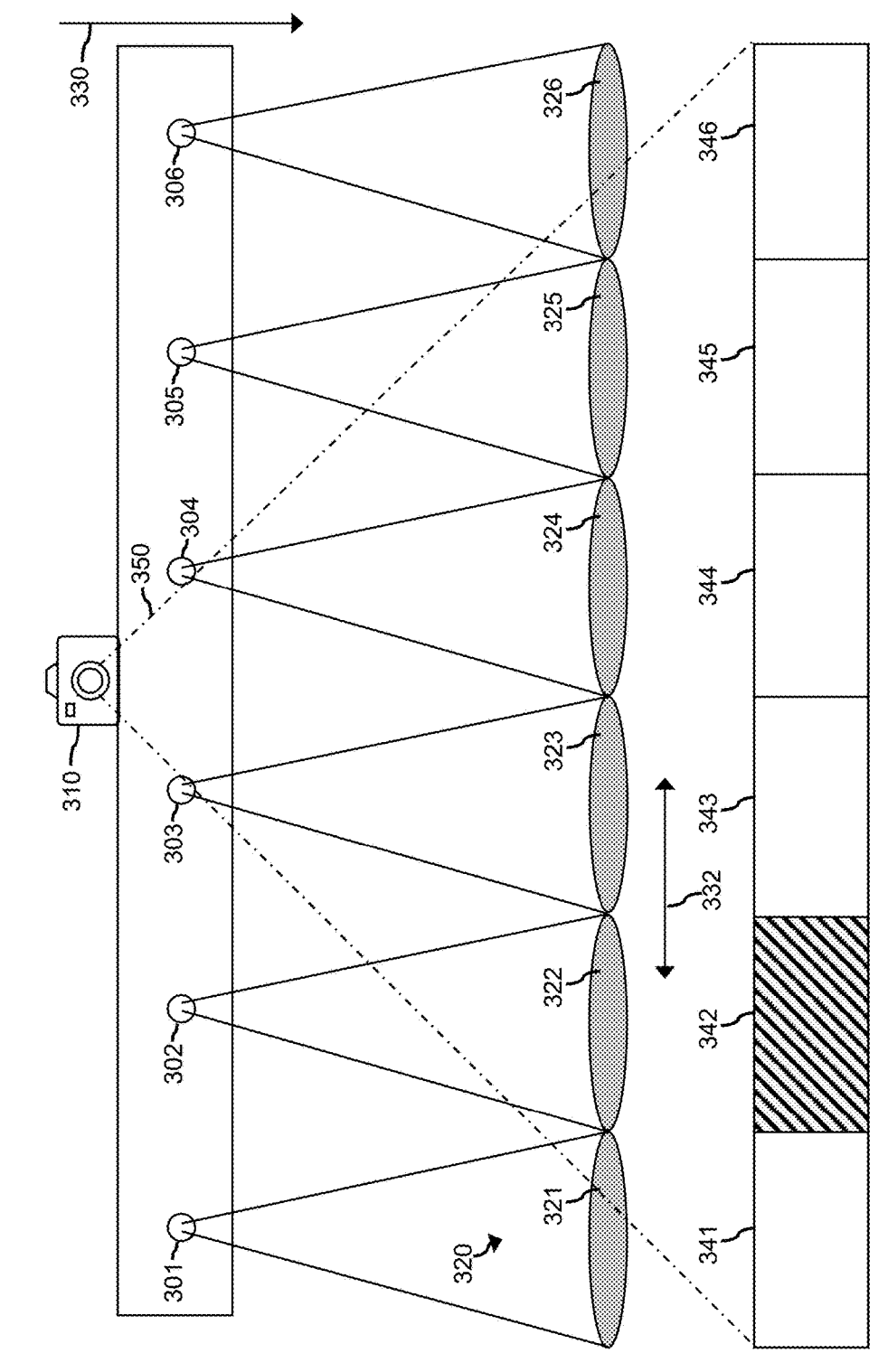

The camera 310 captures an image of the second field region 342 at a second time, as illustrated in FIG. 4. The second field spray area 322 of the second spray nozzle 302 is configured to be aligned with the second field region 342 when the spray boom 30 is moved along its direction of travel 330. The width of the second field region 342 is equal to (or approximately equal to) the width 360 of the second field spay area 322 of the second spray nozzle 302. When the second spray nozzle 302 is activated, the second field spay area 322 is sprayed across its width 360. Spraying of the second field region 342 is maintained for a time period that corresponds to the length 370 of the second field region 342 so that the second spray nozzle 302 sprays throughout the length 370 of the second field region 342. The second spray nozzle 302 stops spraying at the end of the time period. Alternatively, when the length 370 of the second field region 342 is approximately equal to (e.g., within about 5%) the length 390 of the second field spay area 322, the second spray nozzle 302 can spray for a shorter time period and at a flow rate to provide an appropriate volume of specific liquid chemicals across the dimensions (e.g., length 370 and width 360) of the second field region 342.

Figure 5:
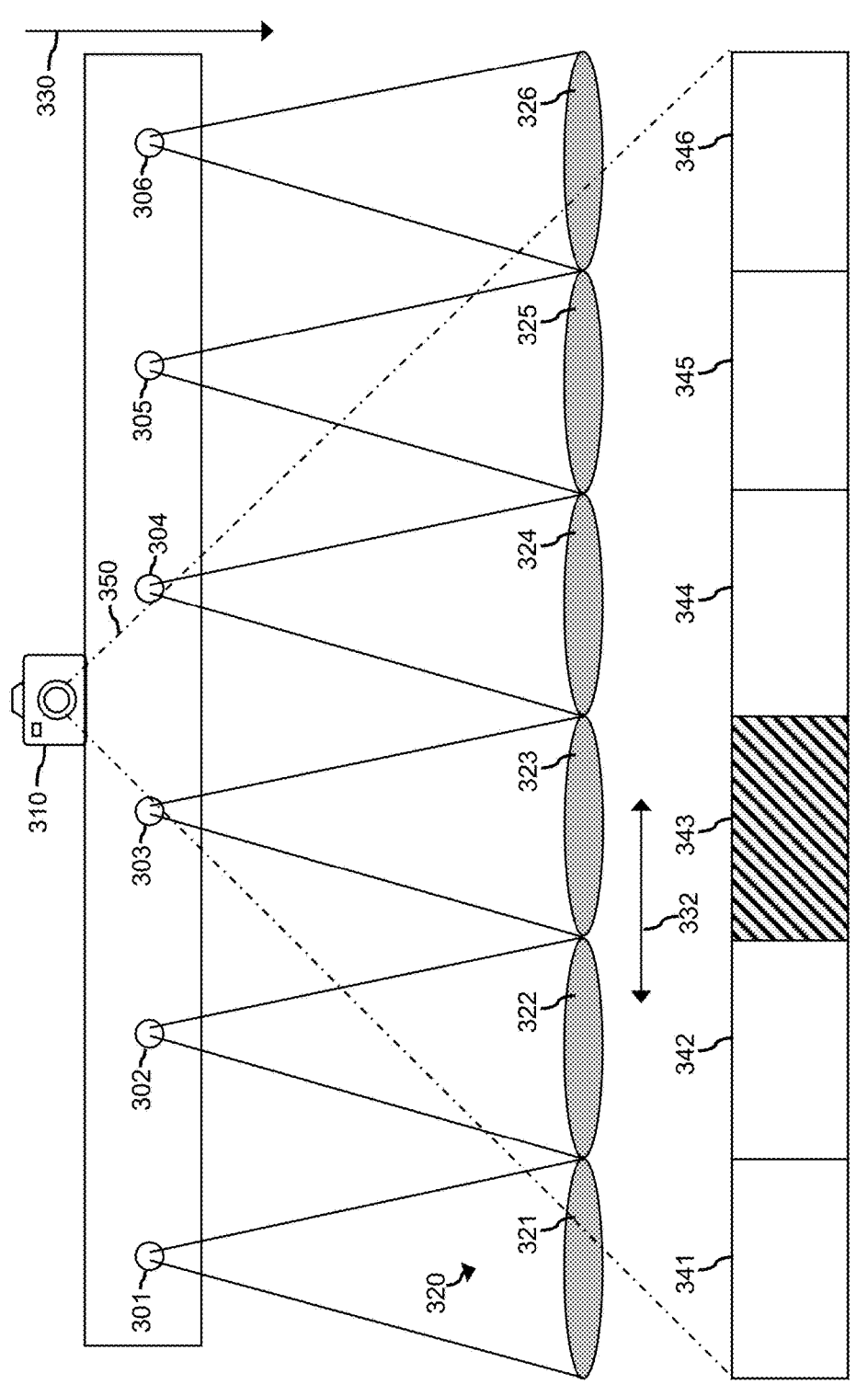

The camera 310 captures an image of the third field region 343 at a third time, as illustrated in FIG. 5. The third field spray area 323 of the third spray nozzle 303 is configured to be aligned with the third field region 343 when the spray boom 30 is moved along its direction of travel 330. The width of the third field region 343 is equal to (or approximately equal to) the width 360 of the third field spay area 323 of the third spray nozzle 303. When the third spray nozzle 303 is activated, the third field spay area 323 is sprayed across its width 360. Spraying of the third field region 343 is maintained for a time period that corresponds to the length 370 of the third field region 343 so that the third spray nozzle 303 sprays throughout the length 370 of the third field region 343. The third spray nozzle 303 stops spraying at the end of the time period. Alternatively, when the length 370 of the third field region 343 is approximately equal to (e.g., within about 5%) the length 390 of the third field spay area 323, the third spray nozzle 303 can spray for a shorter time period and at a flow rate to provide an appropriate volume of specific liquid chemicals across the dimensions (e.g., length 370 and width 360) of the third field region 343.

Figure 6:
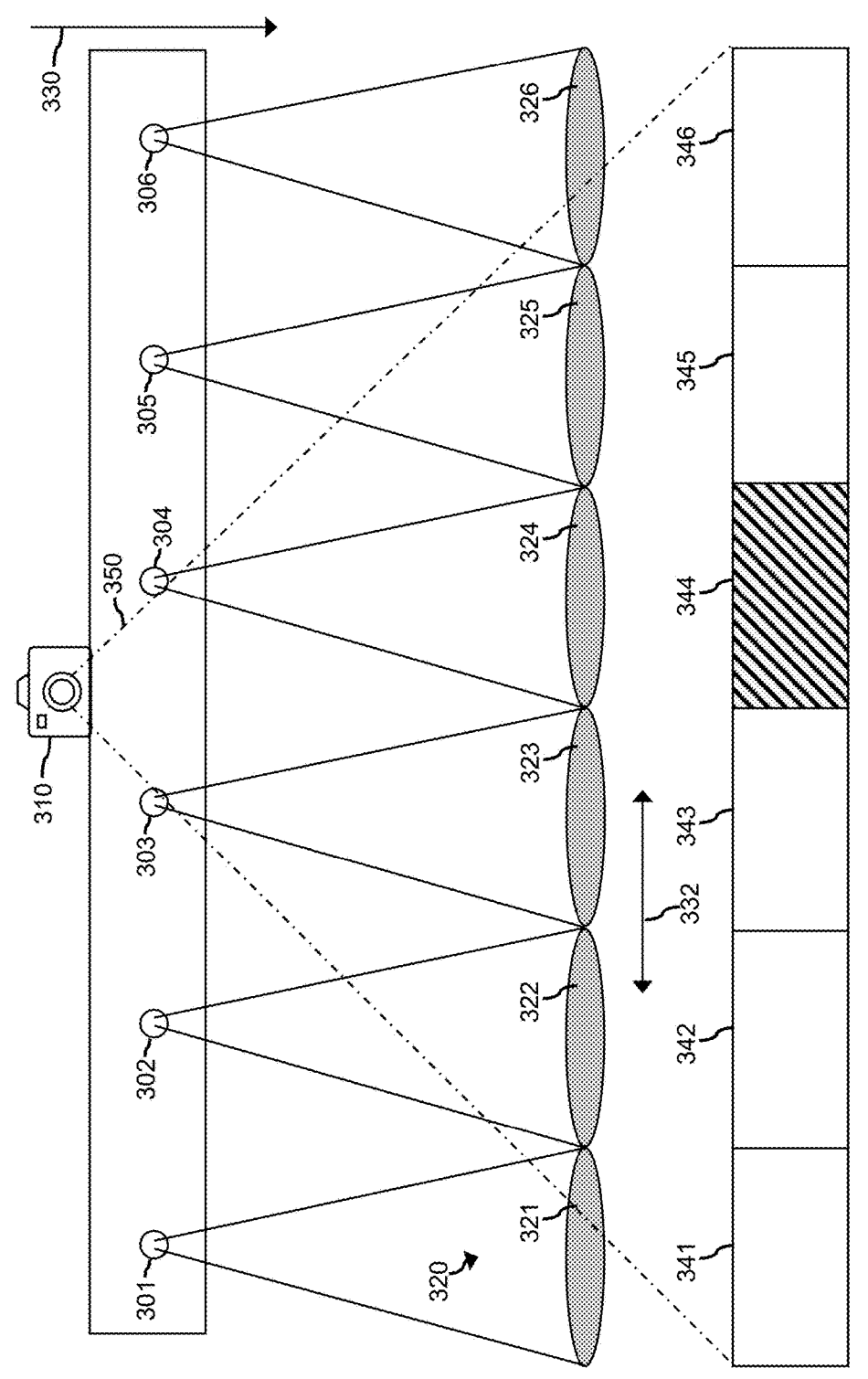

The camera 310 captures an image of the fourth field region 344 at a fourth time, as illustrated in FIG. 6. The fourth field spray area 324 of the fourth spray nozzle 304 is configured to be aligned with the fourth field region 344 when the spray boom 30 is moved along its direction of travel 330. The width of the fourth field region 344 is equal to (or approximately equal to) the width 360 of the fourth field spay area 324 of the fourth spray nozzle 304. When the fourth spray nozzle 304 is activated, the fourth field spay area 324 is sprayed across its width 360. Spraying of the fourth field region 344 is maintained for a time period that corresponds to the length 370 of the fourth field region 344 so that the fourth spray nozzle 304 sprays throughout the length 370 of the fourth field region 344. The fourth spray nozzle 304 stops spraying at the end of the time period. Alternatively, when the length 370 of the fourth field region 344 is approximately equal to (e.g., within about 5%) the length 390 of the fourth field spay area 324, the fourth spray nozzle 304 can spray for a shorter time period and at a flow rate to provide an appropriate volume of specific liquid chemicals across the dimensions (e.g., length 370 and width 360) of the fourth field region 344.

Figure 7:
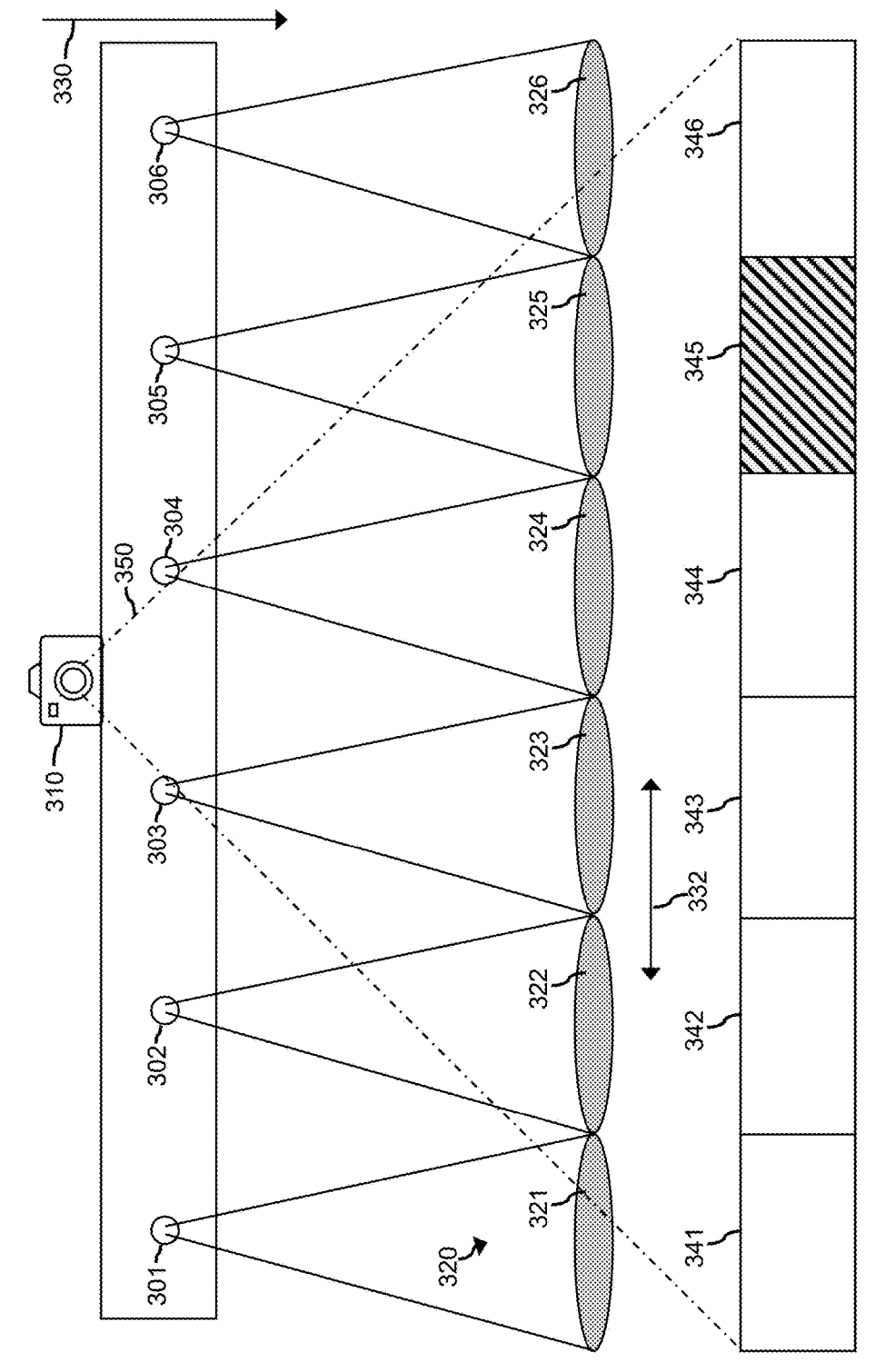

The camera 310 captures an image of the fifth field region 345 at a fifth time, as illustrated in FIG. 7. The fifth field spray area 325 of the fifth spray nozzle 305 is configured to be aligned with the fifth field region 345 when the spray boom 30 is moved along its direction of travel 330. The width of the fifth field region 345 is equal to (or approximately equal to) the width 360 of the fifth field spay area 325 of the fifth spray nozzle 305. When the fifth spray nozzle 305 is activated, the fifth field spay area 325 is sprayed across its width 360. Spraying of the fifth field region 345 is maintained for a time period that corresponds to the length 370 of the fifth field region 345 so that the fifth spray nozzle 305 sprays throughout the length 370 of the fifth field region 345. The fifth spray nozzle 305 stops spraying at the end of the time period. Alternatively, when the length 370 of the fifth field region 345 is approximately equal to (e.g., within about 5%) the length 390 of the fifth field spay area 325, the fifth spray nozzle 305 can spray for a shorter time period and at a flow rate to provide an appropriate volume of specific liquid chemicals across the dimensions (e.g., length 370 and width 360) of the fifth field region 345.

Figure 8:
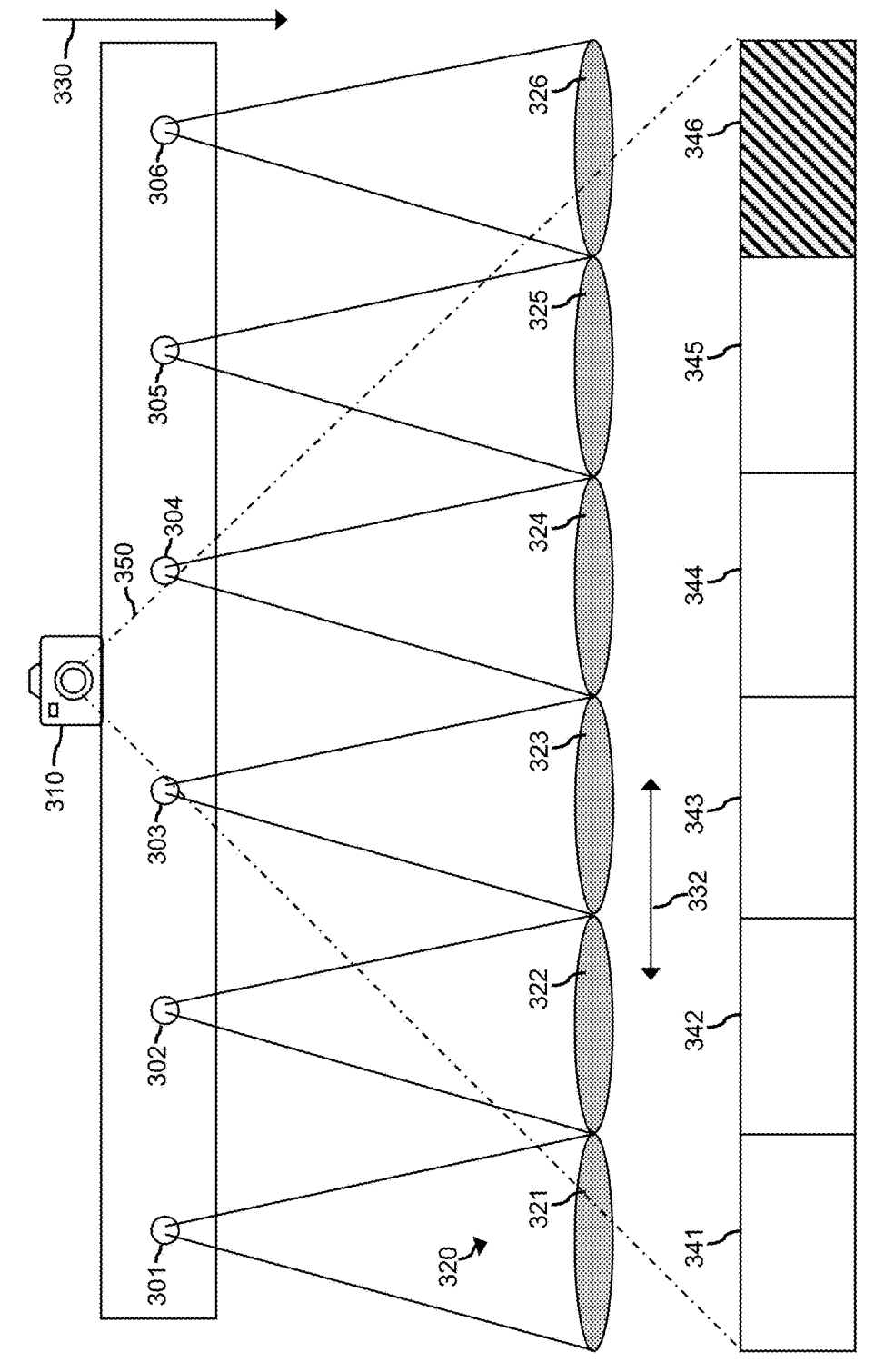

The camera 310 captures an image of the sixth field region 346 at a sixth time, as illustrated in FIG. 8. The sixth field spray area 326 of the sixth spray nozzle 306 is configured to be aligned with the sixth field region 346 when the spray boom 30 is moved along its direction of travel 330. The width of the sixth field region 346 is equal to (or approximately equal to) the width 360 of the sixth field spay area 326 of the sixth spray nozzle 306. When the sixth spray nozzle 306 is activated, the sixth field spay area 326 is sprayed across its width 360. Spraying of the sixth field region 346 is maintained for a time period that corresponds to the length 370 of the sixth field region 346 so that the sixth spray nozzle 306 sprays throughout the length 370 of the sixth field region 346. The sixth spray nozzle 306 stops spraying at the end of the time period. Alternatively, when the length 370 of the sixth field region 346 is approximately equal to (e.g., within about 5%) the length 390 of the sixth field spay area 326, the sixth spray nozzle 306 can spray for a shorter time period and at a flow rate to provide an appropriate volume of specific liquid chemicals across the dimensions (e.g., length 370 and width 360) of the sixth field region 346.

Each image taken by the camera 310 is associated with or corresponds to a respective spray nozzle 300 and a respective nozzle spray area 320.

The sequential images of the field regions 340 can be taken rapidly, for example over about 15 milliseconds (ms) to about 25 ms or over another time period, for all 6 images with different ROI and acquisition parameters as needed for optimal image. Each image is captured separately and independently with its own parameters of ROI, exposure time, etc. and separately sent to the computer (e.g., computer 104) as an individual image.

In another embodiment, the spray nozzles 300 are oriented such that the spray areas 320 are behind the spray boom 30 (e.g., in the opposite direction as the direction of travel 330). An advantage of orienting the spray nozzles 300 to spray behind the spray boom 30 is that more time elapses between when the images of the field regions 340 are taken and when the spray areas 320 are positioned on the respective field regions 340 (e.g., as the spray boom 30 is pushed or pulled by the agricultural vehicle along the direction of travel 330) compared to when the spray nozzles 300 are oriented in front (e.g., in the same direction as the direction of travel 330) of the spray boom 30. The additional time can be beneficial to allow the computer(s) 104 (FIG. 1A) adequate time to process/analyze the captured images and trigger the spray nozzles 300 to spray one or more of the agricultural field regions 340 when weeds are detected.

Figure 9:
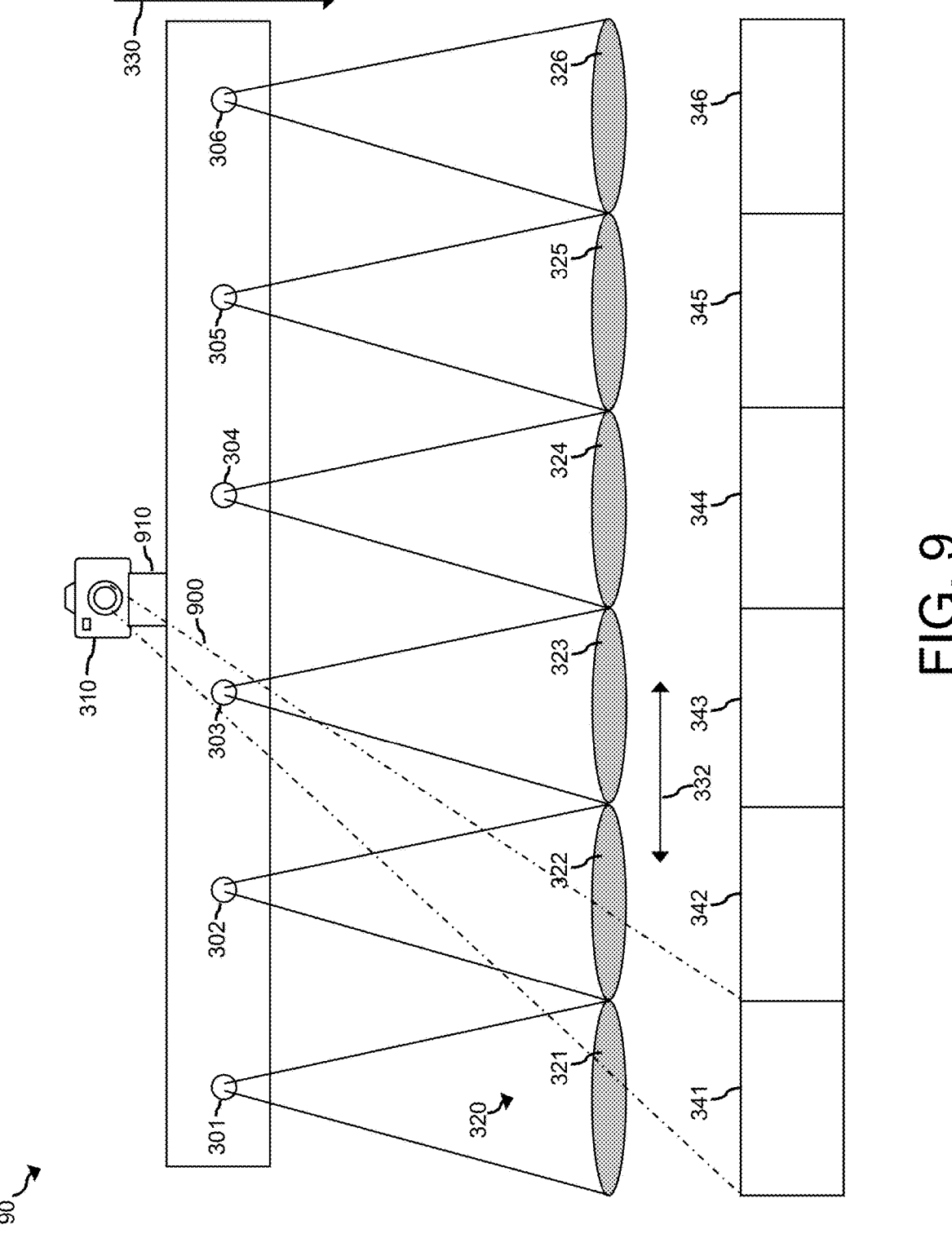
FIG. 9 is a simplified illustration of a portion of a spray boom according to another embodiment.

FIG. 9 is a simplified illustration of a portion of a spray boom 90 according to another embodiment. Spray boom 90 is the same as spray boom 30 except that in spray boom 90 the camera 310 has a narrow FOV 900 such that only one field region 340 lies within the FOV 900 at any one time. A positioning mechanism 910 is mechanically coupled to the camera 310 to pivot/rotate the camera 310 so that the FOV 900 is sequentially moved across each field region 340. The camera 310 sequentially captures an image of each field region 340 as the FOV 900 is moved across the field regions 340. Each field region 340 and the associated image has lateral dimensions (e.g., measured with respect to lateral axis 332) that are equal to (or approximately equal to) the lateral dimensions of the respective field spay area 320 of the respective spray nozzle 300.

The positioning mechanism 910 can be an actuator (e.g., a rotary actuator) or another electromechanical device. The positioning mechanism 910 can be controlled by the computer 104 (FIG. 1A).

Each image is captured separately and independently with its own parameters of ROI, exposure time, etc. and separately sent to the computer (e.g., computer 104) as an individual image.

Figure 10:
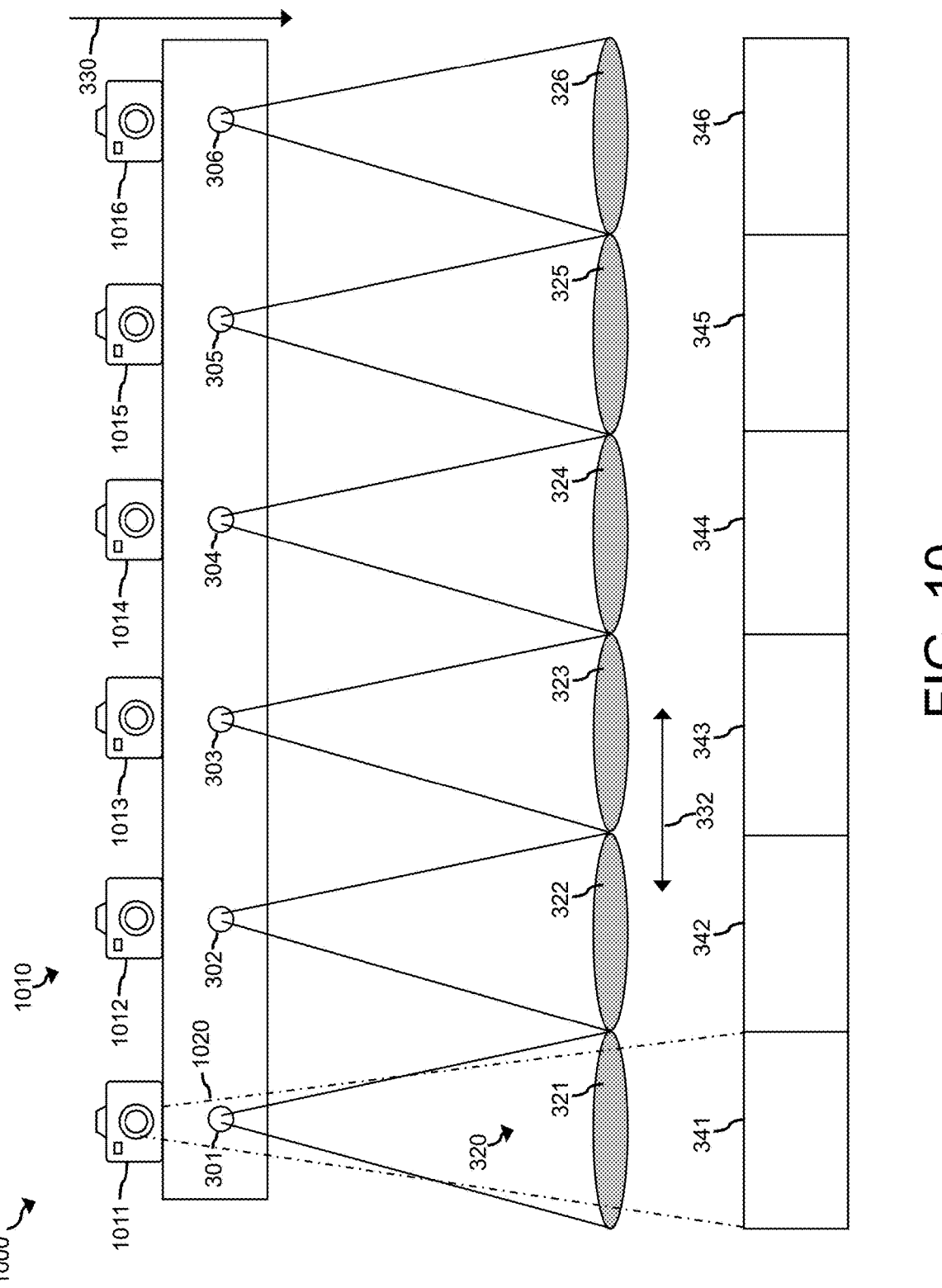
FIG. 10 is a simplified illustration of a portion of a spray boom according to another embodiment.

FIG. 10 is a simplified illustration of a portion of a spray boom 1000 according to another embodiment. Spray boom 1000 is the same as spray boom 30 except that in spray boom 1000 there is one camera per spray nozzle while in spray boom 30 there is one camera per multiple spray nozzles. Spray boom 1000 can be the same as or different than spray boom 110A.

Spray boom 1000 includes multiple spray nozzles 301-306 and cameras 1011-1016 (in general, cameras 1010). Each spray nozzle 301-306 is assigned to or associated with a respective camera 1011-1016. Each camera 1010 is configured to capture images of a respective field region 341-346 at a predetermined distance from the spray boom 1000 along its direction of travel 330. Each camera 1010 can have a narrow FOV 1020 that can be configured to correspond to the dimensions of the respective field region 340 at the predetermined distance. Each field region 340 and the associated image has lateral dimensions (e.g., measured with respect to lateral axis 332) that are equal to (or approximately equal to) the lateral dimensions of the respective field spay area 320 of the respective spray nozzle 300. Each camera 1010 can capture an image in response to a control signal sent from the computer 104 (FIG. 1A).

For example, the first camera 1011 captures an image of the first field region 341, the second camera 1012 captures an image of the second field region 342, the third camera 1013 captures an image of the third field region 343, the fourth camera 1014 captures an image of the fourth field region 344, the fifth camera 1015 captures an image of the fifth field region 345, and the sixth camera 1016 captures an image of the sixth field region 346. Each field spray area 320 is configured to be aligned with the respective field region 340 when the spray boom 1000 is moved along its direction of travel 330. Each image taken by a respective camera 1010 is associated with or corresponds to a respective spray nozzle 300 and a respective nozzle spray area 340. There may be some overlap in the images taken by neighboring cameras, for example to provide full coverage due to height variations of the boom and/or the field.

The cameras 1010 can capture the images of the respective field regions 340 simultaneously or sequentially over time (e.g., over about 20 ms to about 25 ms or over another time period). In some embodiments, each spray nozzle 300 can be integrated with and/or combined with a respective camera 1010 in a single structure or in a single housing. Each image is captured separately and independently with its own parameters of ROI, exposure time, etc. and separately sent to the computer (e.g., computer 104) as an individual image.

The spray nozzles 300 can be oriented such that the spray areas 320 are in front of (e.g., in the same direction as the direction of travel 330) or behind the spray boom 1000 (e.g., in the opposite direction as the direction of travel 330). An advantage of orienting the spray nozzles 300 to spray behind the spray boom 1000 is that more time elapses between when the images of the field regions 340 are taken and when the spray areas 320 are positioned on the respective field regions 340 (e.g., as the spray boom 1000 is pushed or pulled by the agricultural vehicle along the direction of travel 330)

compared to when the spray nozzles 300 are oriented in front (e.g., in the same direction as the direction of travel 330) of the spray boom 1000. The additional time can be beneficial to allow the computer(s) 104 (FIG. 1A) adequate time to process/analyze the captured images and trigger the spray nozzles 300 to spray one or more of the agricultural field regions 340 when weeds are detected.

Figure 11:
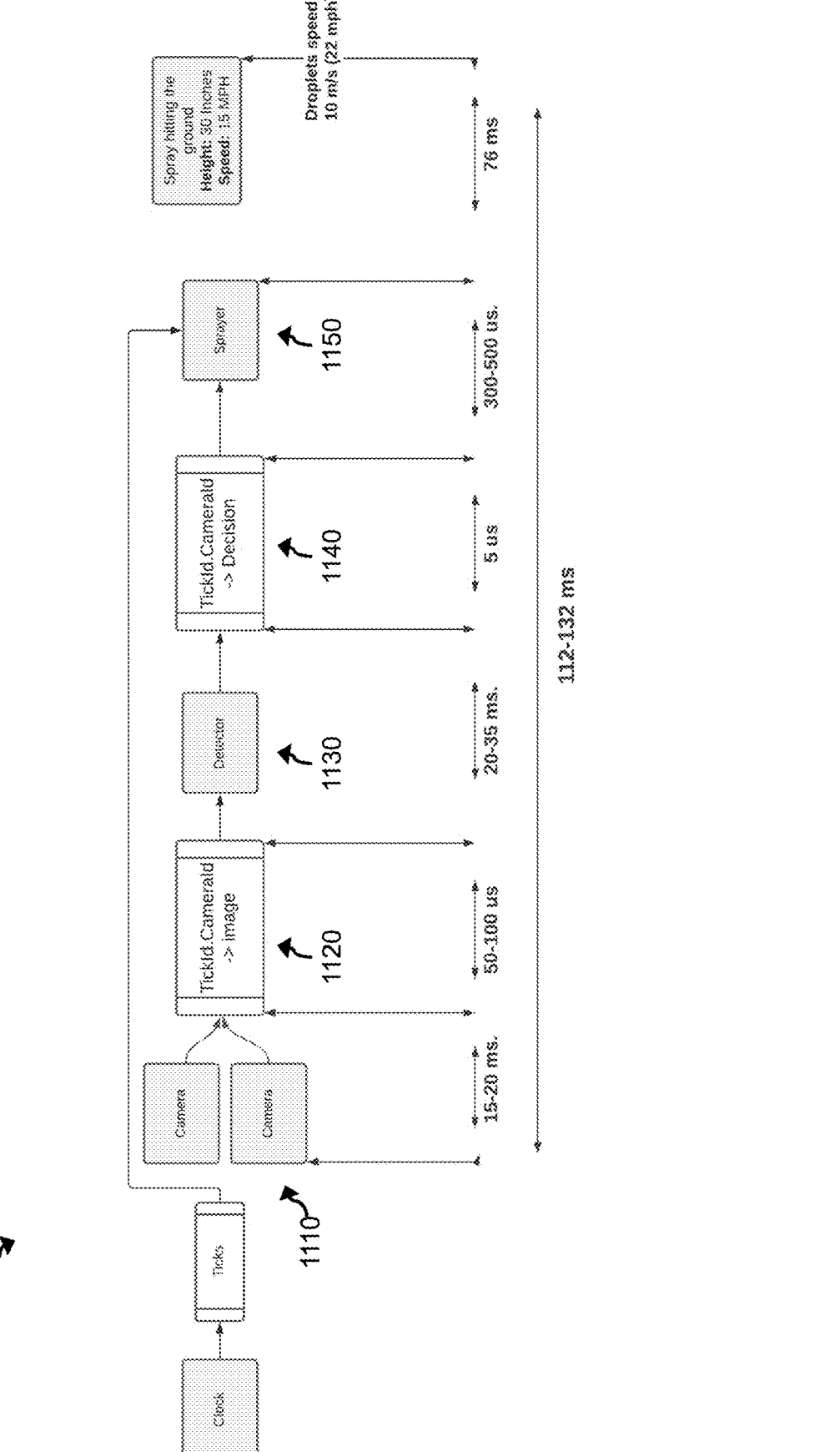
FIG. 11 is a flow chart of a method of operating of a selective spray system according to an embodiment.

FIG. 11 is a flow chart 1100 of a method of operating of the selective spray system including spray boom 30, 90, 1000 according to an embodiment. Example time durations are illustrated in flow chart 1100, but other time durations can be used.

At 1110, one or more images is/are taken by each camera on the spray boom. In spray boom 30, 90, the camera 310 takes a sequential set of images of the respective field regions 341-346. In spray boom 1000, each camera 1011-1016 takes an image of a respective field region 341-346. The cameras can be initiated and/or synchronized using a clock signal and/or a control signal sent from the computer 104 (FIG. 1A).

At 1120, the images are stored and pre-processed. Each image can be stored separately in shared memory. Pre-processing can include fixing or compensating for tilting (e.g., adjusting the image so it appears to be taken from above rather than from the angle of the camera), distortion (e.g., radial distortion caused by camera lens), white/color balance, and/or other pre-processing.

Figure 21:
FIG. 21 illustrates an example of a decision matrix according to an embodiment.
Figure 21:

At 1130, the images are analyzed by a detector module. The detector module can include one or more trained machine learning models (e.g., trained machine learning model 114A), neural networks, and/or artificial intelligence (in general, trained models), that is/are configured to detect weeds in the images. In some embodiments, the detector can include multiple trained models. The output of the detector module is a spray decision (or alternatively a weed detection output) for each image for each trained model. The spray decision (or weed detection output) can be represented digitally, for example with a digital 1 corresponding to a positive spray decision (e.g., at least one weed is detected) and a digital 0 corresponding to a negative spray decision (e.g., no weeds are detected). An example of a decision matrix 2100 is illustrated in FIG. 21.

At 1140, the spray decisions are combined for each image/spray nozzle when the detector module includes multiple trained models. The spray decisions can be combined by applying a Boolean "OR" to the decisions for each image/spray nozzle, in which case the spray output would be a digital 1 for an image/spray nozzle if at least one of the decisions for the image/spray nozzle is a digital 1 (and the other decisions are a digital 0). Alternatively, the spray decisions for each image/spray nozzle can be combined with a weighting factor or a combination of a weighting factor for some of the decisions and an "OR" for other decisions. In another embodiment, the spray decisions can be combined by applying a Boolean "AND" to the decisions for each image/spray nozzle, in which case the spray output would be a digital 1 for an image/spray nozzle if every decision for the image/spray nozzle is a digital 1, otherwise the spray output would be a digital 0.

At 1150, the system causes the spray nozzles to selectively spray the relevant part of the field where weeds are detected (e.g., the FOV of images having a detection result of a digital 1 according to the decision array). The spraying is timed based on the speed/velocity of the spray boom, the speed/velocity of the spray output from the spray nozzles, and optionally the weather (e.g., wind, precipitation) such that the herbicide is applied to the field regions (e.g., field regions 340) that were imaged by the camera(s) and analyzed by the detector module 1130. For example, in decision array 1210, spray nozzles/valves 1, 2, and 8 produce a respective spray that is timed to spray the respective imaged field regions. The spray nozzles can be activated using a control signal sent from the computer 104 (FIG. 1A).

Figure 12:
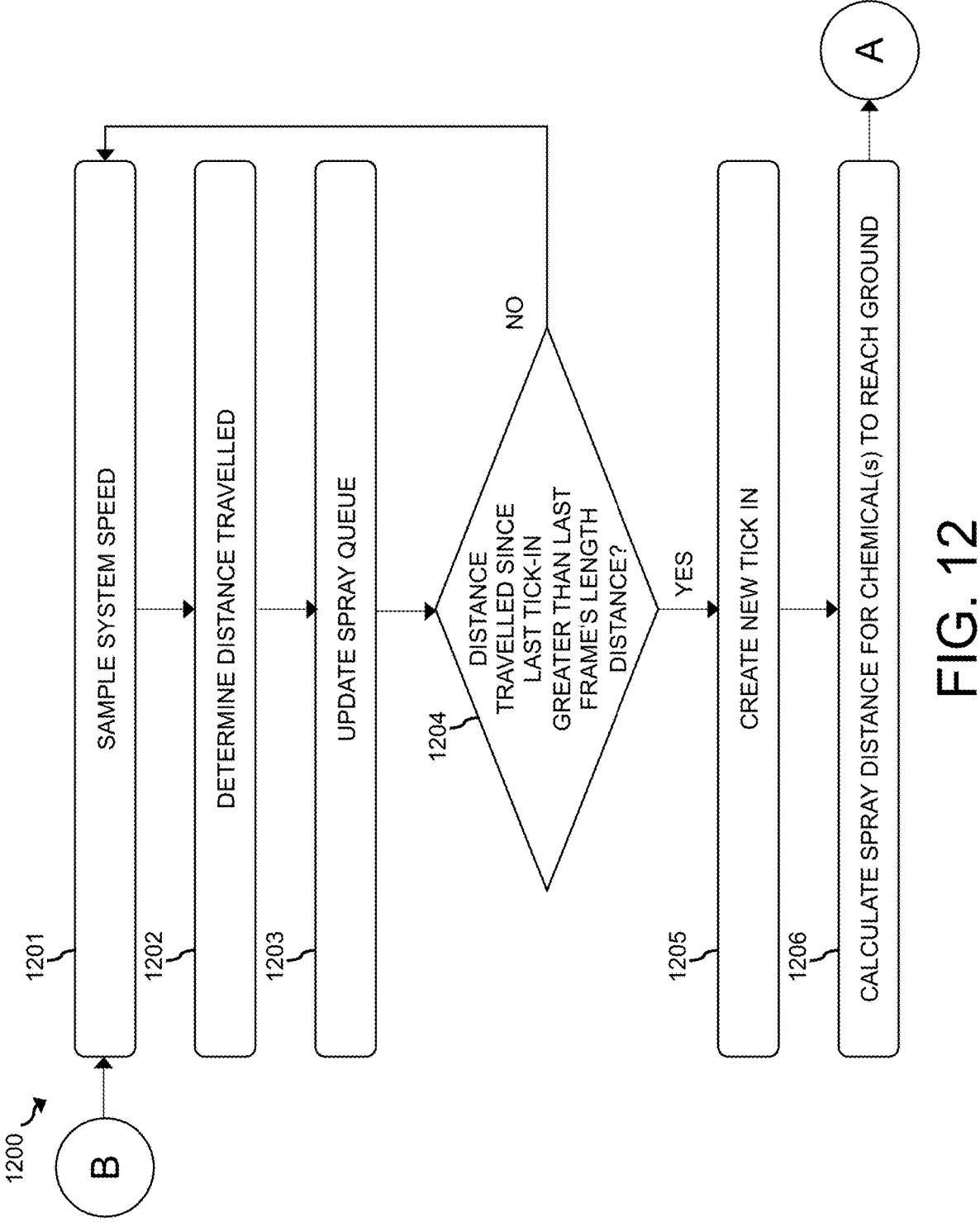
FIG. 12 is a flow chart of a method for synchronizing the timing of image capturing and selective spraying according to an embodiment.
Figure 12:
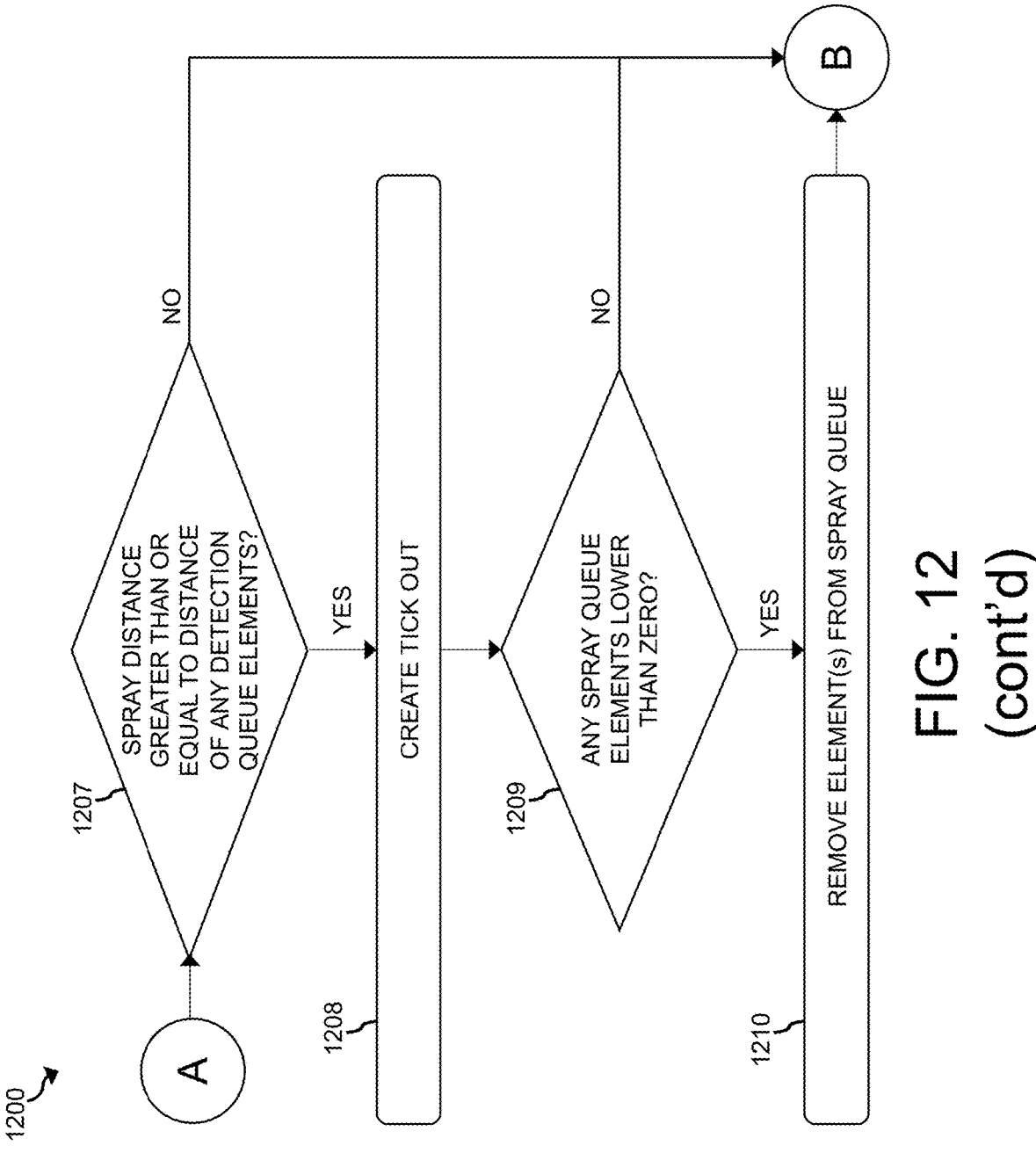

FIG. 12 is a flow chart of a method 1200 for synchronizing the timing of image capturing and selective spraying according to an embodiment. Method 1200 can be performed using system 10. For example, method 1200 can be performed by the computer 104 (e.g., by processor(s) 102 executing code 106A) (FIG. 1A). Additionally or alternatively, the method 1200 can be embodied in computer-readable instructions stored in a non-transitory computer medium.

In step 1201, the system speed is sampled. The system speed can be the speed of the agricultural machine 110 and/or of the spray boom 110A, 30, 90, 1000. The system speed can be determined using a speedometer in the agricultural machine. Additionally or alternatively, the system speed can be determined using the difference in relative or absolute position of the system between the current sampling time and the last sampling time, for example by using a global positioning system, radar, lidar, or another positioning system. The system speed is the difference in the relative or absolute position of the system divided by the sampling frequency.

In step 1202, the distance travelled since the last sample is determined. The distance travelled can be determined by multiplying the sampled speed by the sampling frequency. Alternatively, when the system includes a positioning system (e.g., as described above with respect to step 1201), step 1201 can be optional and the distance travelled since the last sample can be determined directly based on the difference in the relative or absolute position of the system between the current sampling time and the last sampling time.

In step 1203, a spray queue is updated using the distance travelled (determined in step 1202). Additional details of step 1203 are described below.

In step 1204, the system determines whether the distance travelled since the last tick-in is greater than the last frame length's distance. At each tick-in, the camera(s) (e.g., cameras 310, 1010) on the spray boom is/are triggered to take a new image or a new sequence of images. The frame length 210 is the length of the FOV of the camera(s) 310 along the direction of travel 330 of the spray boom, as illustrated in FIG. 2. The frame length 210 is also the length of the imaged regions 340 along the direction of travel 330 of the spray boom. The frame length can be about 25 cm to about 40 cm or another length. For discussion purposes only, the frame length can be about 27 cm. The dimensions (e.g., width and/or length) of the imaged regions 340 are configured to correspond to the spray area of each nozzle 300.

When the distance travelled since the last tick-in is less than or equal to the last frame length's distance (i.e., step 1204=no), the method 1200 loops through steps 1201-1204 until the distance travelled since the last tick-in is greater than the last frame length's distance. When the distance travelled since the last tick-in is greater than the last frame length's distance (i.e., step 1204=yes), the method 1200 proceeds to step 1205.

Figure 13:
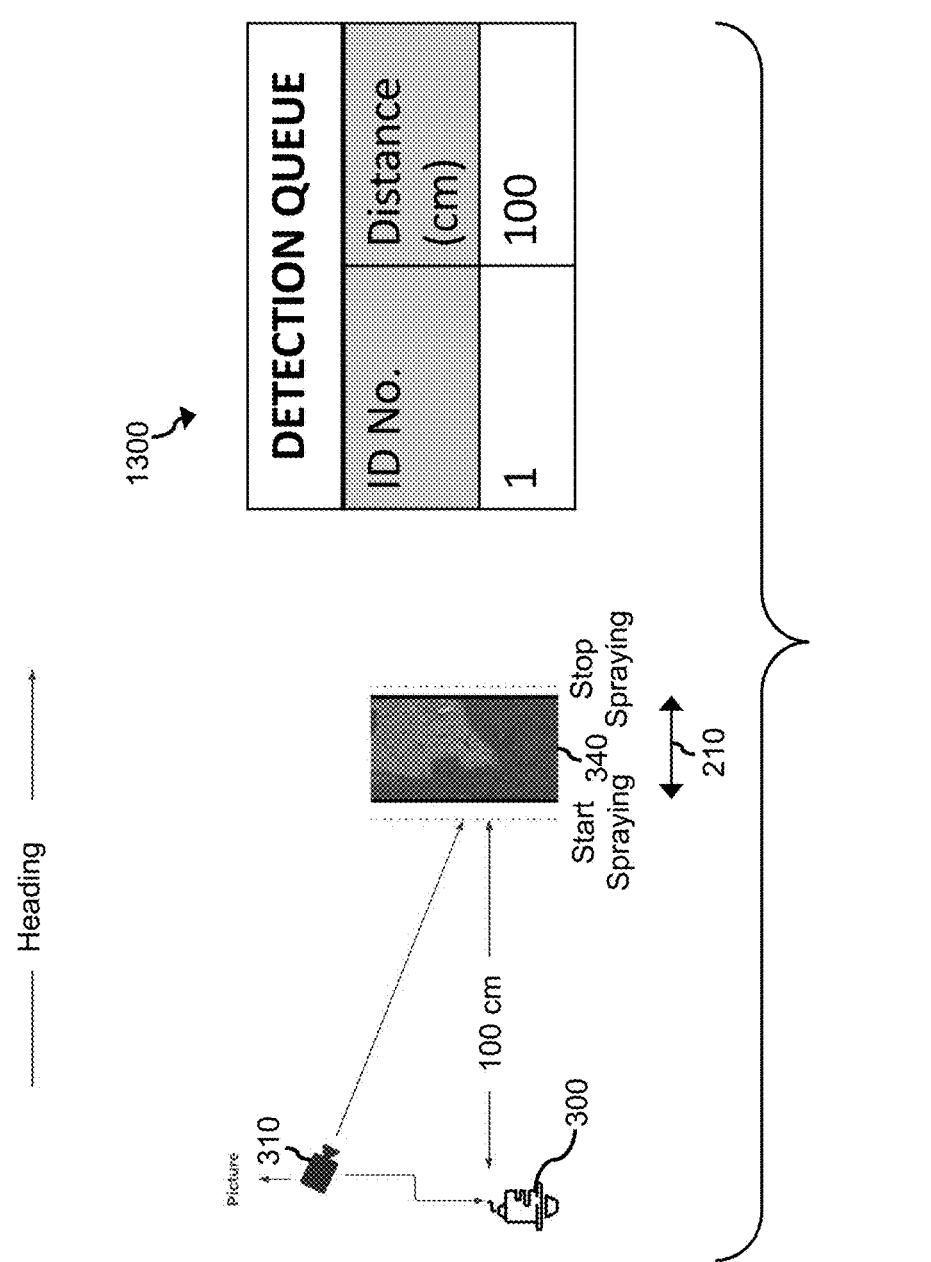

In step 1205, a new tick-in is created. As discussed above, at each tick-in, the camera(s) on the spray boom is/are triggered to take a new image or a new sequence of images. In addition, the distance between the nozzle(s) and the location corresponding to the start of each frame is updated in a detection queue. A new image ID number is created in the detection queue for the new image or set/sequence of images taken. An example of a detection queue 1300 for a first tick-in is illustrated in FIG. 13. The first image (or image set) is assigned ID number 1. The initial relative distance between the nozzle(s) and the start of the frame is fixed. In this example, the initial distance is 100 cm.

In step 1206, the distance at which the chemical(s) sprayed from the nozzle(s) reaches the ground/field is determined. This spray distance is related to the current speed of the system and the height of the nozzle(s) 300 from the ground/field. The spray distance can also be related to the weather (e.g., wind). The distance can be about 15 cm to about 40 cm. For discussion purposes only, the distance can be 16 cm.

In step 1207 (via placeholder A), it is determined whether the spray distance (determined in step 1206) is greater than or equal to the distance of any detection queue elements. Referring to FIG. 13, the spray distance (16 cm) is not greater than the detection queue element 1, which has a nozzle distance of 100 cm. When the spray distance is less than the distance of any detection queue elements (i.e., step 1207=no), the method returns to step 1201 (via placeholder B).

Figure 14:
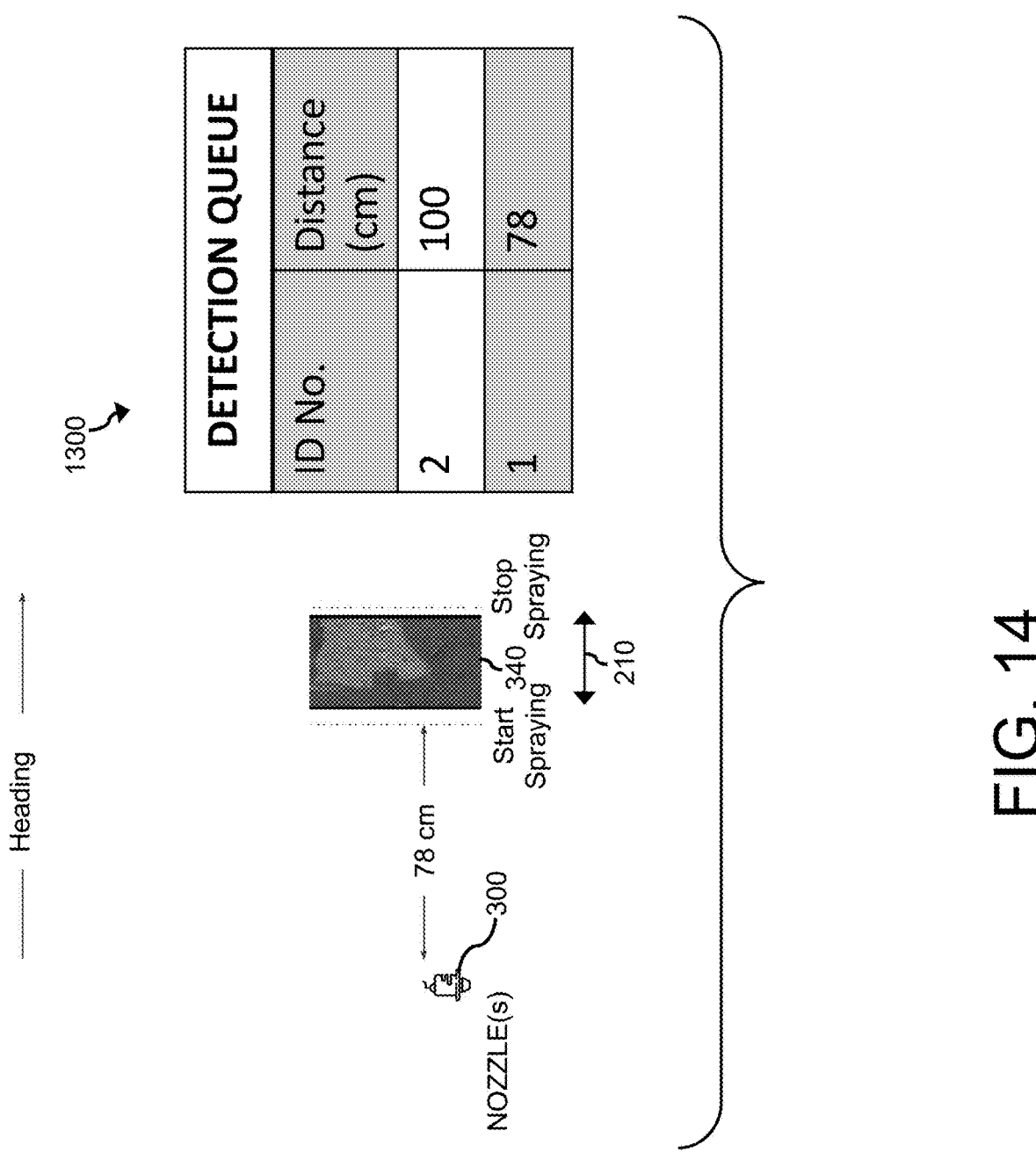

In an example, in the next iteration through steps 1201-1207, it is determined that the nozzle(s) has/have travelled 30 cm since the last sample. Another image is taken and assigned ID No. 2 with the initial nozzle distance of 100 cm. The nozzle distance for the first image (ID No. 1) is now 78 cm. Due to the overlap of the FOV of sequential images (e.g., 8 cm is example), the nozzle distance for the first image (ID No. 1) is now 78 cm and not 70 cm. The updated detection queue 1300 is illustrated in FIG. 14. Since the spray distance (16 cm) is less than the distance of any detection queue elements (i.e., step 1207=no), the method returns to step 1201 (via placeholder B).

Figure 15:
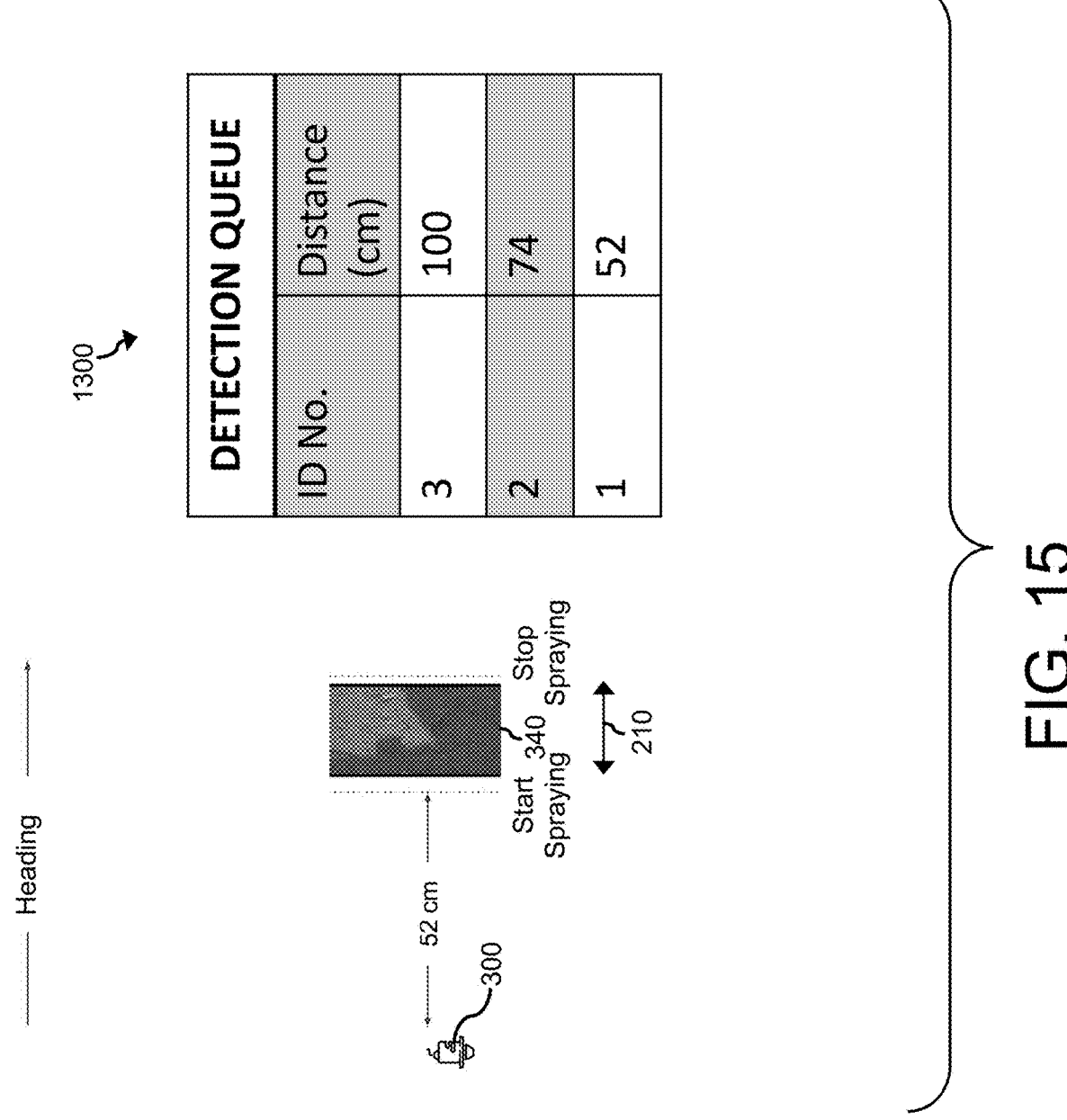

In the next iteration through steps 1201-1207, it is determined that the nozzle(s) has/have travelled 34 cm since the last sample. Another image is taken and assigned ID No. 3 with the initial nozzle distance of 100 cm. The nozzle distance for the first image (ID No. 1) is now 52 cm and the nozzle distance for the second image (ID No. 2) is now 74 cm, taking into account the 8 cm of overlap in the FOV of sequential images. The detection queue is updated in step 1205, and the updated detection queue 1300 in this example is illustrated in FIG. 15. Since the spray distance (16 cm) is less than the distance of any detection queue elements (i.e., step 1207=no), the method returns to step 1201 (via placeholder B).

Figure 16:
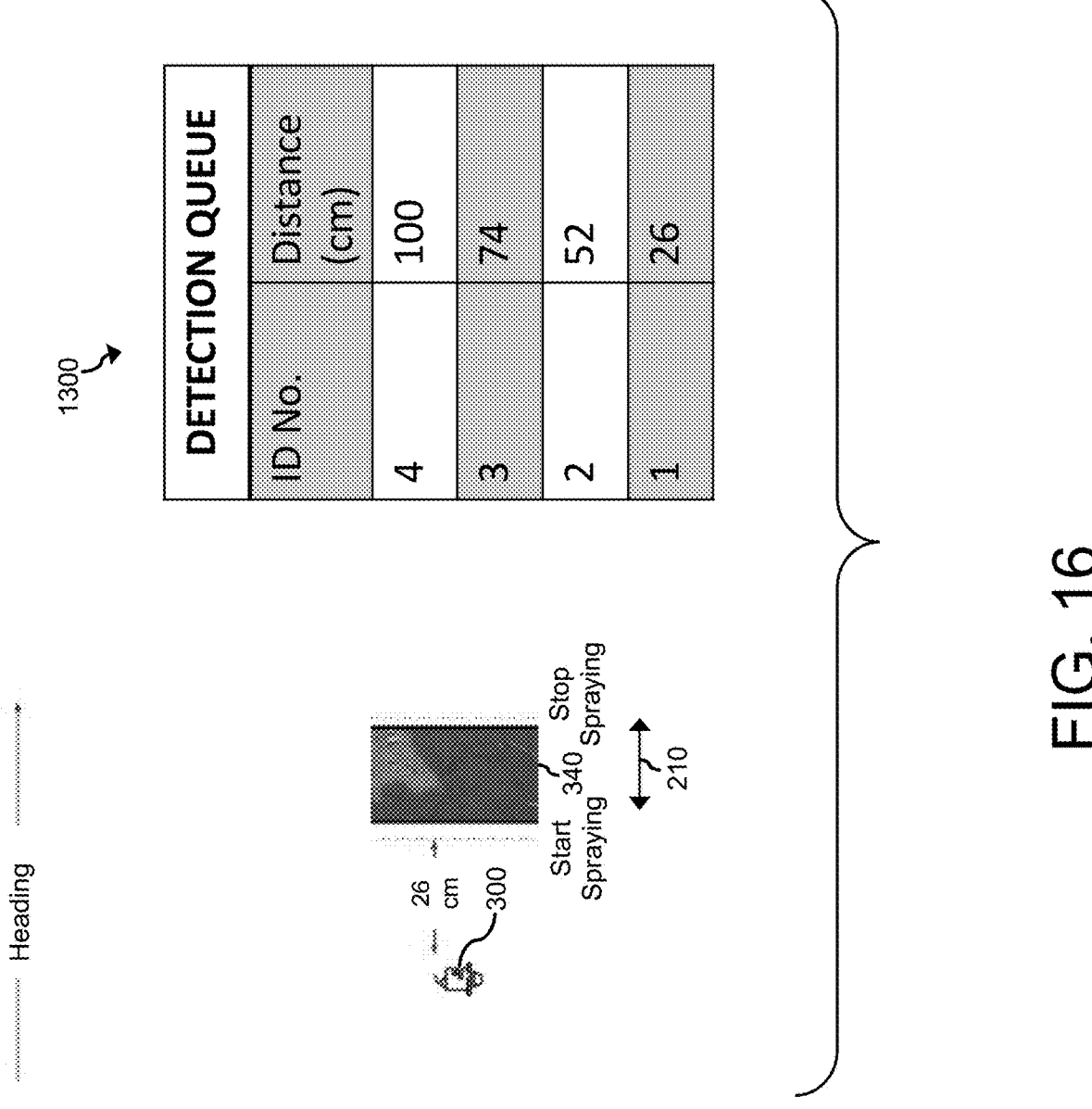

In the next iteration through steps 1201-1207, it is determined that the nozzle(s) has/have travelled 34 cm since the last sample. Another image is taken and assigned ID No. 4 with the initial nozzle distance of 100 cm. The nozzle distance for the first image (ID No. 1) is now 26 cm, the nozzle distance for the second image (ID No. 2) is now 52 cm, and the nozzle distance for the third image (ID No. 3) is now 74 cm, taking into account the 8 cm over overlap in the FOV of sequential images. The detection queue is updated in step 1205, and the updated detection queue 1300 in this example is illustrated in FIG. 16. Since the spray distance (16 cm) is less than the distance of any detection queue elements (i.e., step 1207=no), the method returns to step 1201 (via placeholder B).

In the next iteration through steps 1201-1207, it is determined that the nozzle(s) has/have travelled 10 cm since the last sample. Another image is not taken in step 1205 since the distance travelled (10 cm) is less than the frame length distance (27 cm) of the last frame. The detection queue is updated in step 1205, and the updated detection queue 1300 in this example is illustrated in FIG. 17.

Figure 18:
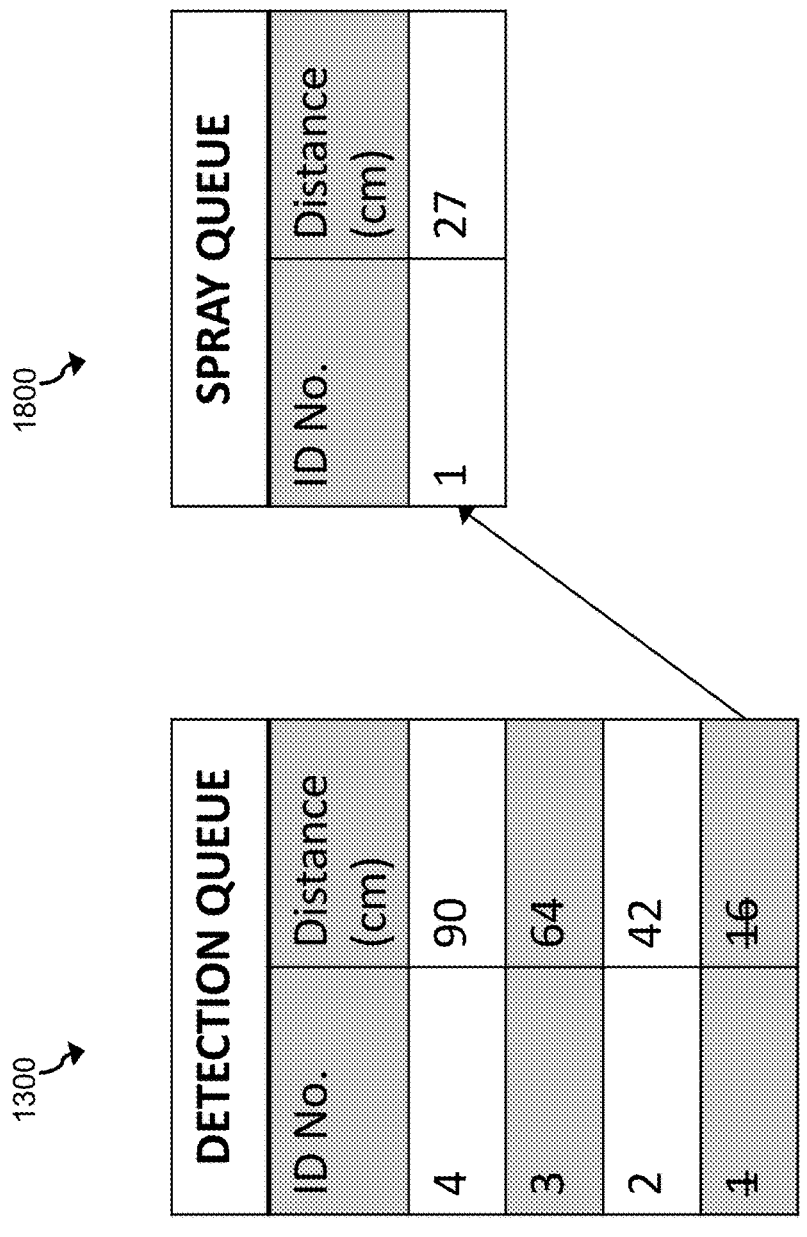
FIGS. 18-20 are simplified illustrations of a detection queue and a spray queue according to an embodiment.

In step 1207, it is determined that the spray distance (16 cm) is equal to one of the detection queue elements (e.g., ID No. 1 in FIG. 17) (i.e., step 1207=yes), and the method 1200 proceeds to step 1208 where a tick-out is created. A tick-out includes sending a trigger to the sprayer/nozzle to set the spray at 27 cm and pushing the detection queue element nozzle ID(s) that have a distance less than or equal to the spray distance from the detection queue 1300 into a spray queue 1800, as illustrated in FIG. 18. The detection queue element nozzle ID(s) pushed to the spray queue 1800 is/are assigned a spray distance that is equal to the frame length distance (e.g., 27 cm in this example). The sprayer(s)/nozzle(s) is/are activated when the tick-out is created to spray the field regions (e.g., field regions 340) in which weeds are detected in the respective images. The sprayer/nozzles can be activated according to a decision matrix.

The sprayer(s)/nozzle(s) can maintain the spray for a time period along the length 370 (e.g., frame length distance) of the respective field region(s). The time period can be determined according to the system speed. The sprayer(s)/nozzle(s) can stop spraying at the end of the time period such that the sprayer(s)/nozzle(s) only spray across the dimensions (e.g., length 370 and width 360) of the respective field region(s). Alternatively, when the length of the respective field region(s) is approximately equal to (e.g., within about 5%) the length of the respective field spay area(s) of the respective sprayer(s)/nozzle(s), the respective sprayer(s)/nozzle(s) can spray for a shorter time period and at a flow rate to provide an appropriate volume of specific liquid chemicals across the dimensions (e.g., length 370 and width 360) of the respective field spay area(s).

An example of a decision matrix 2100 for images corresponding to 12 valves/spray nozzles is illustrated in FIG. 21. The decision matrix 2100 includes 12 decisions for each valve/spray nozzle where each decision is an output of a respective trained model. Each decision is represented as a digital 1 (positive spray decision) or a digital 0 (negative spray decision. The decision matrix 2100 can include additional or fewer decisions in other embodiments. Each decision can be combined by weighting, voting (e.g., majority, super majority), Boolean logic (e.g., AND, OR) to provide a final/combined decision 2110 that can be used to determine which sprayer/nozzles is/are activated.

In step 1209, it is determined whether any elements or ID Nos. in the spray queue have a distance that is less than or equal to zero. The spray queue is updated in each iteration through step 1203. A distance less than or equal to zero indicates that the nozzle has travelled too far and can no longer spray the field area corresponding to the FOV of the respective ID No. If all elements or ID Nos. in the spray queue that have a respective distance that is greater than zero (i.e., step 1209=no), the method 1200 returns to step 1201 (via placeholder B). If at least one element or ID No. in the spray queue has a respective distance that is less than or equal to zero (i.e., step 1209=yes), the method 1200 proceeds to step 1210 where those element(s)/ID No(s). is/are removed from the spray queue. After the element(s)/ID No(s). is/are removed from the spray queue, the method 1200 returns to step 1201 (via placeholder B).

Figure 19:
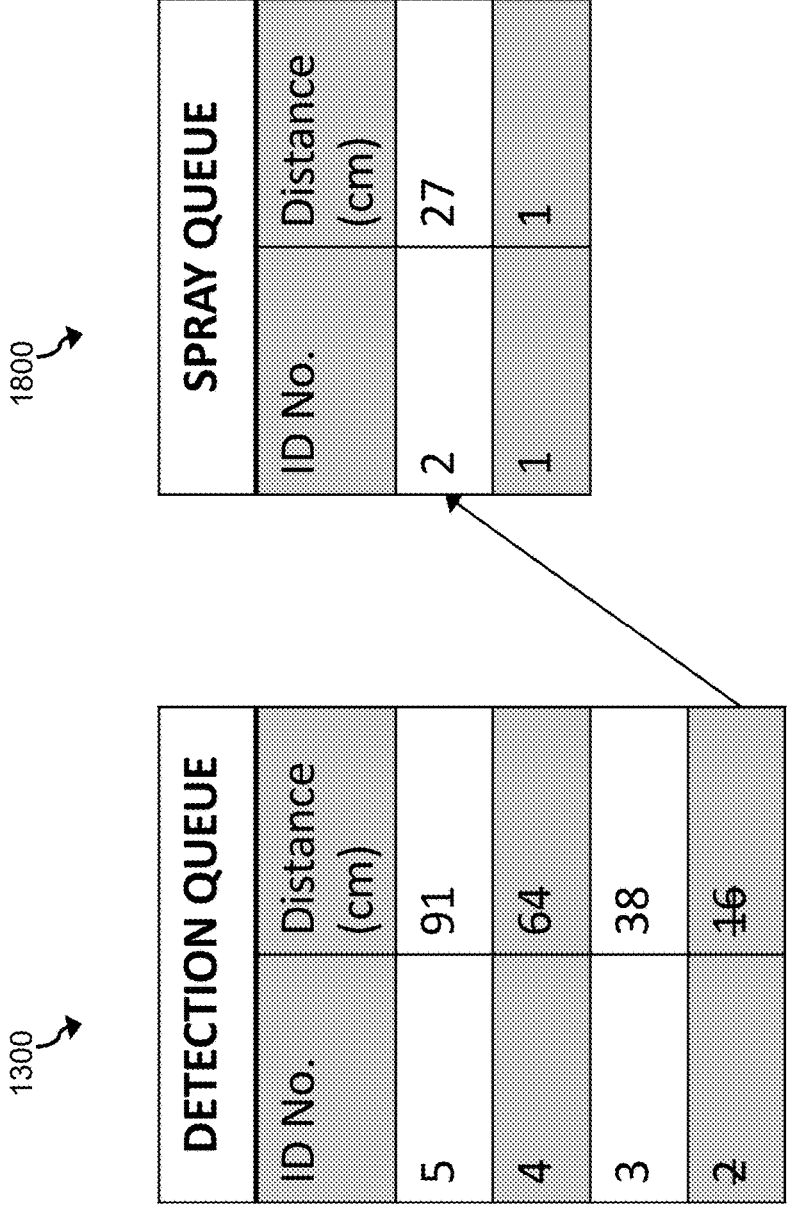

For example, in another iteration through steps 1201-1209, it is determined that the nozzle(s) have moved 26 cm in which case ID No. 2 is moved from the detection queue 1300 to the spray queue 1800, as illustrated in FIG. 19. After 1 cm of movement (e.g., in another iteration through step

Figure 20:
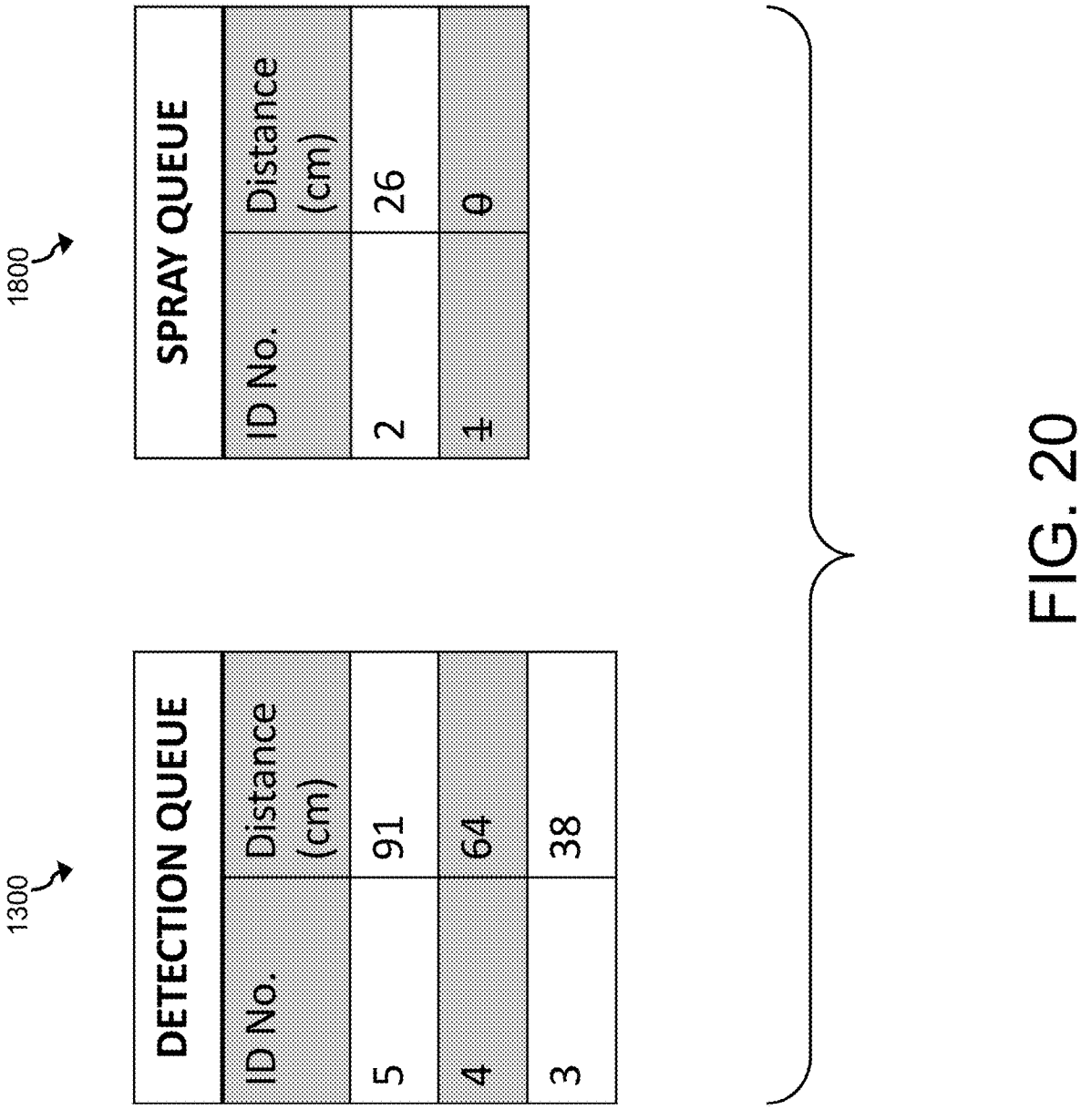

1201-1209), the distance of ID No. 1 is zero and that ID is removed from the spray queue 1800 in step 1210, as illustrated in FIG. 20.

The method 1200 continues in a loop until the method 1200 is automatically or manually stopped.

In an embodiment, the selective spray system is configured to synchronize selective spraying with images of an agricultural field. The system includes an agricultural vehicle that includes or is attached to a spray boom. The system further includes at least one camera mounted on the spray boom. The camera is configured to: capture images of the field in front (e.g., in the direction of movement) of the agricultural vehicle. images captured represent of portions of the agriculture field that are at least 50 cm ahead of the spray boom. A selective spray line is mounted on the spray boom. The selective spray line includes or is fluidly coupled to at least one nozzle that is pointed to a portion of the field at, e.g., 50 cm ahead of the boom. Each nozzle is axially aligned with the FOV of a respective camera. The system further includes a processing unit that is operatively coupled to computer storage space operative to store a sequence of images and a trained machine learning model configured to detect one or more target growths (e.g., weeds) in the captured images. The system is configured (e.g., using a timing algorithm) to send a signal to spray a portion of the field that accurately corresponds to an image that includes one or more detected target growths. The system implements a detection queue and a spray queue. Each of the detection queue and the spray queue include at least the parameters of a unique image identifier and a distance of the field corresponding to each image from a nozzle spray point value. The system can store a frame length value that corresponds to a calibrated length of the field in the FOV of the camera. The system can also store a spray distance value that can be calculated using the agricultural vehicle speed/velocity, the boom height, and the wind condition. The spray distance value corresponds to the distance that the agricultural vehicle will pass from nozzle activation until one or more agricultural chemicals reach the field.

The timing algorithm can trigger a new image or a new sequence of images to be captured every frame length value using the agricultural vehicle velocity. The timing algorithm adds to the detection queue every new image and sets a unique id and distance-to-nozzle value. The timing algorithm can update the distance-to-nozzle value of every image in the queue frequently (e.g., iteratively) using the agricultural vehicle velocity. The timing algorithm can remove an image from the detection queue when the detection algorithm detects no weeds in the image or the distance parameter is below a predetermined minimum value. The timing algorithm can move an image to the spray queue when the detection algorithm detects at least one weed in the image and the distance parameter reaches the spray distance value. The timing algorithm can set the distance value of the imaged moved to the spray queue to the frame length value. The timing algorithm can update the distance value of every image in the spray queue frequently (e.g., iteratively) using the agricultural vehicle velocity. The timing algorithm can trigger the nozzle whenever an image is in the spay queue and the distance value is greater than zero. The timing algorithm can remove an image from the spay queue when the distance reaches zero. Thus, the system can achieve a robust timing performance that prevents drifting enabling high performance in high velocity to the selective spray solution.

Figure 22:
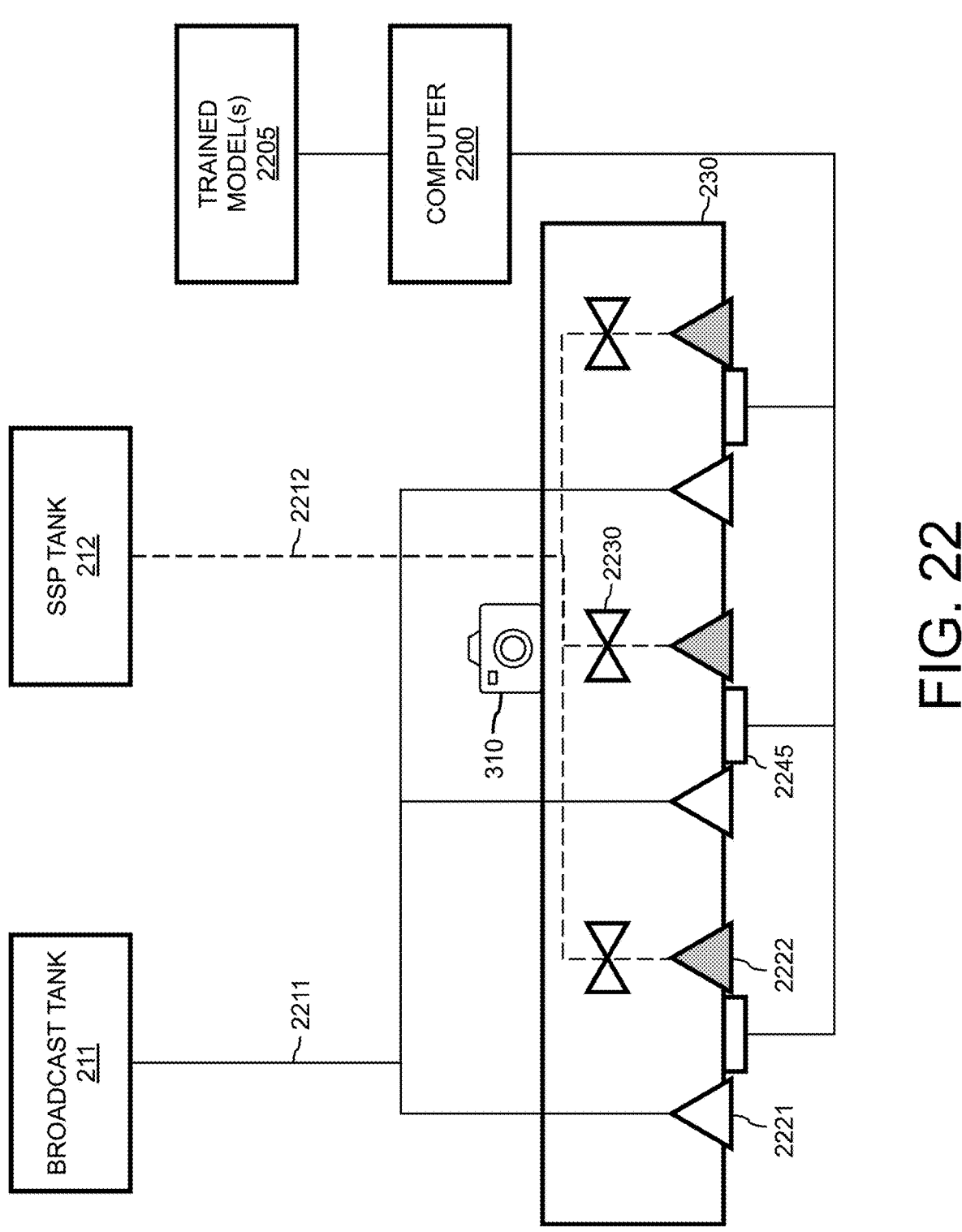
FIG. 22 is a block diagram of fluid and electrical circuits for the broadcast tank and the SSP tank of the dual-spray system illustrated in FIG. 1B and according to an embodiment.

FIG. 22 is a block diagram of fluid and electrical circuits for the broadcast tank 211 and the SSP tank 212 of the dual-spray system 20 illustrated in FIG. 1B and according to an embodiment. One or more fluid lines 2211 fluidly couple the broadcast tank 211 to a plurality of broadcast nozzles 2221 on the spray boom 230. One or more fluid lines 2212 fluidly couple the SSP tank 212 to a plurality of SSP nozzles 2222 on the spray boom 230. Electromechanically actuated valves 2230 are fluidly coupled to the fluid line(s) 2212 between each SSP nozzle 2222 and the SSP tank 212.

The state of each valve 2230 is controlled by control signals output from one or more computers or controllers 2200 which is/are electrically coupled to each valve 2230. Additional computers and/or controllers can be provided. The computer(s)/controller(s) 2200 selectively opens and closes each valve 2230 when weeds are detected using images of the agricultural field that are obtained by camera(s) 310 and/or other image sensors mounted on the spray boom 230. Lights 2245 such as light-emitting diodes (LEDs) can be used provide light for the agricultural field. The camera(s) 310 and lights 2245 are in electrical communication with the computer(s)/controller(s) 2200 to detect weeds in the images using one or more trained machine learning models 2205. The camera(s) are configured to capture one or more images of the agricultural field in response to control signals sent from the computer(s)/controller(s) 2200.

The fluid circuits for the broadcast tank 211 and the SSP tank 212 can include additional components, such as pumps, filters, sensors, and/or other components.

The invention should not be considered limited to the particular embodiments described above. Various modifications, equivalent processes, as well as numerous structures to which the invention may be applicable, will be readily apparent to those skilled in the art to which the invention is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of this application need not reside on a single computer or processor but may be distributed in a modular fashion among a number of different computers or processors to implement various aspects of this application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the disclosure and claims include new and novel improvements to existing methods and technologies, which were not previously known nor implemented to achieve the useful results described above. Users of the method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A method of selective spraying, comprising:

in a selective-spray system that includes a spray boom attached to an agricultural vehicle, the spray boom including a plurality of cameras and a plurality of selective-spot spray (SSP) nozzles, the spray boom having a length measured with respect to an axis:

capturing, with each camera, a respective image of a respective region of an agricultural field, each region at a predetermined lateral distance from the spray boom along a direction of travel of the agricultural vehicle, each image associated with only a respective SSP nozzle, each region having a width corresponding to a spray width of the respective SSP nozzle, the width of each region and the spray width measured with respect to the axis, each camera having a respective field-of-view (FOV) configured to correspond to a respective field spray area of the respective SSP nozzle;

automatically analyzing, with a computer, each image for a presence of at least one weed;

automatically detecting, with the computer, the at least one weed in one or more images; and automatically selectively spraying only one or more of the respective regions of the agricultural field using one or more of the SSP nozzles associated with the one or more images where the at least one weed is detected.

2. The method of claim 1, further comprising:

monitoring, for each image, a respective distance between the respective region of the agricultural field and the spray boom; and when the respective distance is less than or equal to a threshold distance, automatically selectively spraying the one or more of the respective regions of the agricultural field using the one or more of the SSP nozzles associated with the one or more images where the at least one weed is detected.

3. The method of claim 1, further comprising:

maintaining a selective spray of the one or more of the respective regions of the agricultural field for a time period that corresponds to a length of each of the one or more of the respective regions; and stopping the selective spray of the one or more of the respective regions of the agricultural field at an end of the time period.

4. The method of claim 1, further comprising:

setting, with the computer, an initial nozzle-to-image distance for each image, the initial nozzle-to-image distance equal to the predetermined distance;

repeatedly sampling, with the computer, a speed of the selective-spray system at respective sample times;

repeatedly determining, with the computer, a current travel distance that the selective-spray system travelled since the respective capture time of each image, the travel distance determined using a current sampled speed of the selective-spray system, the travel distance measured with respect to an axis;

repeatedly determining, with the computer, a respective current nozzle-to-image distance for each image, the respective current nozzle-to-image distance based on the initial nozzle-to-image distance and the current travel distance;

repeatedly determining, with the computer, a current spray distance for a selective-spray output from one of the SSP nozzles to reach the agricultural field, the current spray distance determined using the current sampled speed of the selective-spray system and a height of the SSP nozzles, the spray distance measured with respect to the axis; and when the current spray distance is greater than or equal to the respective current nozzle-to-image distance for a first image where the at least one weed is detected, automatically selectively spraying the agricultural field using the SSP associated with the first image.

5. The method of claim 4, further comprising maintaining the respective current nozzle-to-image distance for each image in a detection queue, each image having a respective image identifier.

6. The method of claim 5, further comprising:

transferring each image from the detection queue to a spray queue when the respective current nozzle-to-image distance is less than or equal to the current spray distance; and when a respective image is transferred from the detection queue to the spray queue, assigning the respective image a spray distance equal to a frame length of the respective image, the frame length measured with respect to the axis.

7. The method of claim 6, further comprising activating the SSP selective-spray nozzle associated with the first image when the first image is transferred from the detection queue to the spray queue.

8. A selective sprayer system comprising:

an agricultural vehicle;

a selective-spot spray (SSP) tank mounted on the agricultural vehicle, the SSP tank holding one or more specific liquid chemicals for treating one or more target weeds growing in the agricultural field; and a spray boom attached to the agricultural vehicle, the spray boom including:

a boom frame;

a plurality of SSP nozzles spatially distributed across a length of the spray boom, the length measured with respect to an axis, the SSP nozzles fluidly coupled to the SSP tank, each SSP nozzle configured to spray the one or more specific liquid chemicals onto a respective field spray area, the respective field spray area having a respective spray width that is measured with respect to the axis; and a plurality of cameras spatially distributed across the length of the spray boom, each camera associated with only a respective SSP nozzle and having a respective field-of-view (FOV) configured to correspond to the respective field spray area of the respective SSP nozzle;

one or more microprocessors in electrical communication with the cameras and the SSP nozzles; and non-volatile computer memory operatively coupled to the one or more processors, the non-volatile computer memory storing computer-readable instructions that, when executed by the one or more processors, cause the one or more processors to:

automatically send a first control signal to the cameras, the first control signal causing each camera to capture a respective image of a respective region of the agricultural field according to the respective FOV of the respective camera, each region at a predetermined lateral distance from the spray boom along a direction of travel of the agricultural vehicle, each image associated with only the respective SSP nozzle, each region having a width corresponding to the respective FOV of the respective camera and the respective spray width of the respective SSP nozzle;

automatically analyze each image for a presence of at least one weed;

automatically detect the at least one weed in one or more of the images; and automatically send a second control signal to one or more of the SSP nozzles, the second control signal causing the one or more of the SSP nozzles to selectively spray only one or more of the respective regions of the agricultural field according to the one or more images where the at least one weed is detected.

9. A method of selective spraying, comprising:

in a selective-spray system that includes a spray boom attached to an agricultural vehicle, the spray boom having a length measured with respect to an axis:

with a camera associated with a plurality of selective-spot spray (SSP) nozzles, the camera and SSP nozzles mounted on the spray boom, sequentially capturing images of respective regions of an agricultural field, each region at a predetermined lateral distance from the spray boom along a direction of travel of the agricultural vehicle, each region having a width corresponding to a spray width of the respective SSP nozzle, the width of each region and the spray width measured with respect to the axis, each image associated with only a respective SSP nozzle, each image captured at a respective capture time;

automatically analyzing, with a computer, each image for a presence of at least one weed;

automatically detecting, with the computer, the at least one weed in one or more of the images; and automatically selectively spraying only one or more of the respective regions of the agricultural field using one or more of the SSP nozzles according to the one or more images where the at least one weed is detected.

10. The method of claim 9, wherein:

the camera has a field-of-view that includes all the respective regions of the agricultural field, and the method further comprises maintaining the field-of-view of the camera while sequentially capturing the images.

11. The method of claim 9, wherein:

the camera has a field-of-view that includes only one of the respective regions of the agricultural field, and the method further comprises:

sequentially aligning the field-of-view with each region of the agricultural field; and capturing each image when the field-of-view is aligned with the respective region of the agricultural field.

12. The method of claim 9, further comprising:

maintaining a selective spray of the one or more of the respective regions of the agricultural field for a time period that corresponds to a length of each of the one or more of the respective regions; and stopping the selective spray of the one or more of the respective regions of the agricultural field at an end of the time period.

13. The method of claim 9, further comprising:

monitoring, for each image, a respective distance between the respective region of the agricultural field and the spray boom; and when the respective distance is less than or equal to a threshold distance, automatically selectively spraying the one or more of the respective regions of the agricultural field using the one or more of the SSP nozzles associated with the one or more images where the at least one weed is detected.

14. The method of claim 9, further comprising:

setting, with the computer, an initial nozzle-to-image distance for each image, the initial nozzle-to-image distance equal to the predetermined distance;

repeatedly sampling, with the computer, a speed of the selective-spray system at respective sample times;

repeatedly determining, with the computer, a current travel distance that the selective-spray system travelled since the respective capture time of each image, the travel distance determined using a current sampled speed of the selective-spray system, the travel distance measured with respect to an axis;

repeatedly determining, with the computer, a respective current nozzle-to-image distance for each image, the respective current nozzle-to-image distance based on the initial nozzle-to-image distance and the current travel distance;

repeatedly determining, with the computer, a current spray distance for a selective-spray output from one of the SSP nozzles to reach the agricultural field, the current spray distance determined using the current sampled speed of the selective-spray system and a height of the SSP nozzles, the spray distance measured with respect to the axis; and when the current spray distance is greater than or equal to the respective current nozzle-to-image distance for a first image where the at least one weed is detected, automatically selectively spraying the agricultural field using the SSP nozzle associated with the first image.

15. The method of claim 14, further comprising maintaining the respective current nozzle-to-image distance for each image in a detection queue, each image having a respective image identifier.

16. The method of claim 15, further comprising:

transferring each image from the detection queue to a spray queue when the respective current nozzle-to-image distance is less than or equal to the current spray distance; and when a respective image is transferred from the detection queue to the spray queue, assigning the respective image a spray distance equal to a frame length of the respective image, the frame length measured with respect to the axis.

17. The method of claim 16, further comprising activating the SSP nozzle associated with the first image when the first image is transferred from the detection queue to the spray queue.

18. A selective sprayer system comprising:

an agricultural vehicle;

a selective-spot spray (SSP) tank mounted on the agricultural vehicle, the SSP tank holding one or more specific liquid chemicals for treating one or more target weeds growing in the agricultural field; and a spray boom attached to the agricultural vehicle, the spray boom including:

a boom frame;

a plurality of SSP nozzles spatially distributed across a length of the spray boom, the length measured with respect to an axis, the SSP nozzles fluidly coupled to the SSP tank, each SSP nozzle configured to spray the one or more specific liquid chemicals only onto a respective field spray area, the respective field spray area having a respective spray width that is measured with respect to the axis; and a camera mounted on the boom frame, wherein the camera is associated with the SSP nozzles;

one or more microprocessors in electrical communication with the camera and the SSP nozzles; and non-volatile computer memory operatively coupled to the one or more microprocessors, the non-volatile computer memory storing computer-readable instructions that, when executed by the one or more microprocessors, cause the one or more microprocessors to:

automatically send a first control signal to the camera, the first control signal causing the camera to sequentially capture images of respective regions of an agricultural field, each region at a predetermined lateral distance from the spray boom along a direction of travel of the agricultural vehicle, each region having a width corresponding to a spray width of the respective SSP nozzle, the width of each region and the spray width measured with respect to the axis, each image associated with only a respective SSP nozzle, each image captured at a respective capture time;

automatically analyze each image for a presence of at least one weed;

automatically detect the at least one weed in one or more of the images; and automatically send a second control signal to one or more of the SSP nozzles, the second control signal causing the one or more of the SSP nozzles to selectively spray only one or more of the respective regions of the agricultural field according to the one or more images where the at least one weed is detected.

* * * * *